United States Patent [19]
Cooper et al.

[11] Patent Number: 6,065,309
[45] Date of Patent: May 23, 2000

[54] FLOAT PROCESSING OF HIGH-TEMPERATURE COMPLEX SILICATE GLASSES AND FLOAT BATHS USED FOR SAME

[75] Inventors: Reid Franklin Cooper, Middleton, Wis.; Glen Bennett Cook, Corning, N.Y.

[73] Assignee: Wisconsin Alumni Research Foundation, Madison, Wis.

[21] Appl. No.: 09/156,138

[22] Filed: Sep. 17, 1998

Related U.S. Application Data

[60] Provisional application No. 60/059,688, Sep. 20, 1997.

[51] Int. Cl.$^7$ .................................................. C03B 18/00
[52] U.S. Cl. ........................................ 65/99.2; 65/182.3
[58] Field of Search .................................. 65/99.2, 99.3, 65/99.4, 99.5, 182.3; 148/430, 432, 433; 420/469, 470, 490, 501, 507

[56] References Cited

U.S. PATENT DOCUMENTS

| | | | |
|---|---|---|---|
| 710,357 | 9/1902 | Heal | 65/95 |
| 2,741,877 | 4/1956 | Dobrovolny | 264/165 |
| 2,911,759 | 11/1959 | Pilkington et al. | 65/99.1 |
| 3,083,551 | 4/1963 | Pilkington | 65/32.5 |
| 3,127,261 | 3/1964 | Long | 65/83 |
| 3,218,141 | 11/1965 | Lambert | 65/83 |
| 3,220,816 | 11/1965 | Pilkington | 65/99.2 |
| 3,222,154 | 12/1965 | Pilkington | 65/91 |
| 3,233,995 | 2/1966 | Javaux | 65/99.5 |
| 3,323,890 | 6/1967 | Javaux | 65/24 |
| 3,326,652 | 6/1967 | Plumat | 65/99.2 |
| 3,342,574 | 9/1967 | Jewell | 65/32.5 |
| 3,450,516 | 6/1969 | Emhiser et al. | 65/99.2 |
| 3,658,501 | 4/1972 | Lawrenson et al. | 65/30.13 |
| 3,843,344 | 10/1974 | Galey | 65/99.2 |
| 4,380,463 | 4/1983 | Matesa | 65/99.2 |
| 4,405,352 | 9/1983 | Bloss et al. | 65/99.4 |
| 4,406,682 | 9/1983 | Ernsberger | 65/99.4 |

FOREIGN PATENT DOCUMENTS 1421720  10/1972  Germany .

*Primary Examiner*—Sean Vincent
*Attorney, Agent, or Firm*—Foley & Lardner

[57] ABSTRACT

A float glass process for production of high melting temperature glasses utilizes a binary metal alloy bath having the combined properties of a low melting point, low reactivity with oxygen, low vapor pressure, and minimal reactivity with the silicate glasses being formed. The metal alloy of the float medium is exothermic with a solvent metal that does not readily form an oxide. The vapor pressure of both components in the alloy is low enough to prevent deleterious vapor deposition, and there is minimal chemical and inter-diffusive interaction of either component with silicate glasses under the float processing conditions. Alloys having the desired combination of properties include compositions in which gold, silver or copper is the solvent metal and silicon, germanium or tin is the solute, preferably in eutectic or near-eutectic compositions.

42 Claims, 28 Drawing Sheets

FLOAT PROCESSING OF HIGH-TEMPERATURE COMPLEX SILICATE GLASSES AND FLOAT BATHS USED FOR SAME

This application claims the benefit of U.S. provisional application Ser. No. 60/059,688, filed Sep. 20, 1997.

This invention was made with United States government support awarded by the following agencies: NASA, Grant No. NAGW-2835; NSF, Grant Nos. CMS-9414756, CTS-9707934, DMR-9122687, EAR-9220603, CTS-9526035, and EAR-9706213. The United States government has certain rights in this invention.

FIELD OF THE INVENTION

This invention pertains generally to the field of glass manufacturing and particularly to the float process in which a glass sheet is formed on a liquid metal float medium.

BACKGROUND OF THE INVENTION

The manufacture of high-information-content flat-panel displays for the computer and video markets imposes stringent requirements for the substrate that supports the electronic display elements. A substrate is required that is rigid, nearly atomically smooth and flat, transparent with very low optical distortion, resistant to thermal-stress buildup, with the thermal expansion coefficient close to that of silicon, that has the ability to accept surface chemical modifications and coatings (including strong chemical washes), and that is thermally stable at post-forming processing temperatures of 600° C. to 800° C. for tens of hours.

To meet these requirements, glass manufacturers have developed suitable glasses and manufacturing techniques for such glasses. For example, Corning, Inc. has developed a new class of alkaline earth aluminoborosilicate glass substrates produced via the fusion draw process in which a highly viscous glass melt is poured over a "fusion pipe" that separates the stream into two smooth melt sheets. The sheets are rejoined (fused) below the pipe and cooled, producing a flat glass ribbon with two virgin sides. See, D. M. Moffat, "Flat Panel Display Substrates," Mat. Res. Soc. Symp. Proc., Vol. 345, 1994, pp. 163–174; D. M. Moffat, "Glass Substrates for Flat Panel Displays," MRS Bulletin, Vol. 21, 1996, pp. 31–34. Such fusion glasses can meet the requirements noted above, producing extremely flat, thin (less than 0.5 mm thick) glass sheets. However, due to the high viscosity of the glass melts involved, the fusion draw process is limited by a relatively slow production rate. In addition, only a very limited number of glass compositions can be handled by the fusion draw process because of the extreme viscosity restrictions of the process.

The float process is the dominant method of flat glass manufacturing for architectural applications. As commercially developed, the process allows economic production of relatively wide (e.g., four meters) glass ribbons at rates of up to kilometers per day. The float process has been optimized for manufacture of soda-lime-silica (NCS) glass, which is well suited for architectural applications. However, NCS float glass is not generally compatible chemically with the electronic elements of high resolution flat panel displays, and typically cannot meet the rigorous tolerances at the thicknesses required for such flat panel displays. Conversely, the conventional float process is not suited to the manufacture of glasses such as aluminoborosilicate which must be formed at higher temperatures than NCS glass.

In the typical commercial float process, an NCS glass melt is poured from the melting-conditioning furnace onto a bath of molten tin. See, generally, W. C. Hynd, "Flat-Glass Manufacturing Processes," in *Glass Science and Technology*, Vol. 2, D. R. Uhlmann and N. J. Kreidel, Eds., Academic Press, New York, 1984, pp. 83–100. The glass is applied to the liquid tin at a temperature of about 1100° C. (a silicate melt viscosity of $10^3$ Poise), resulting in a nearly perfectly flat ribbon of molten glass being formed on the liquid tin. Typical commercial molten tin float baths have dimensions on the order of 5 meters wide and 50 meters long. As the glass melt ribbon travels the length of the float bath, with the molten tin acting as a conveyor, it is subjected to a controlled cooling gradient, reducing its viscosity until it is cool and stiff enough (about 600° C., $10^{10}$ p) to be transferred to an annealing lehr. Depending on the thickness of the glass, residence time of the ribbon on the tin bath can vary from 150 seconds for a 2 mm thick sheet to 880 seconds for a 12 mm thick sheet. Pure tin is typically used for the float medium because of its unique combination of properties of low melting point (232° C.), high boiling point (2623° C.), low vapor pressure at the processing temperatures used (about $10^{-6}$ atmospheres at 1100° C.), and a density (7 $g\text{-}cm^{-3}$) that is greater than that of an NCS glass melt (2.5 $g\text{-}cm^{-3}$) so that the glass will float. The bath structure typically includes a refractory lined (e.g., $ZrO_2$—$Al_2O_3$—$SiO_2$) steel tank. The bath is fully enclosed above the tank and contains a reducing gas mixture ("forming gas"—95% $N_2$-5%$H_2$) under a positive pressure to prevent oxidation of the tin. The enclosure is designed to allow for the placement of overhead electrical resistance heating elements that maintain the desired temperature gradient of the cooling and stiffening glass ribbon, and water-cooled steel top-of-the-glass rollers assist in the control of thickness and placement of the ribbon of floating glass. The glass ribbon emerges from the float tank through a flame curtain where the $H_2$ component of the forming gas is burned. As the molten glass spreads on the surface of the metal, nearly perfectly flat and parallel top and bottom surfaces are produced on the glass ribbon. The thickness of the final product is set through control of the mass flow rate of the glass down the bath relative to the rate of glass melt introduction at the hot end of the bath, with attractive force being applied by edge rollers to pull or slow the progress of the glass down the length of the tin bath or by the use of non-wetting (e.g., graphite) barriers that prohibit the melt from spreading to an equilibrium thickness. As noted, the float process has been optimized in the glass industry for a narrow range of NCS glass compositions to produce optical distortion-free architectural and automotive glasses. For the NCS compositions, it has been found that the chemical interaction between the liquid tin and the NCS glass is minimal (i.e., the oxidation and reduction reactions between the two materials are relatively small) at the processing temperatures and conditions that are used in the commercial process.

Because of the high production rates that can be achieved using the float process, it would be desirable to be able to produce float-quality flat glass of other, more complex compositions, for applications such as improved automobile windshields (low infrared transmission) and flat panel display screens (low thermal expansion coefficients). However, the current commercial float process cannot produce such glasses because of inherent mismatches in the basic properties of the tin float bath and the glasses to be floated. For example, glasses with higher melting points than NCS glasses, such as glass-ceramic precursors, require higher float processing temperatures than NCS glasses during both pouring and cooling, as high as 1500° C. At these temperatures, the tin vapor pressure is too high, and tin would be deposited on the top (non-float side) of the glass ribbon. In addition, because the glass-ceramic process requires the homogeneous distribution of transition metal cations (such as $Ti^{4+}$ or $Fe^{2+,3+}$) and specific oxidation states to achieve the desired crystallization of the precursor glass, the effect of oxidation and reduction reactions and interdiffusion between a very low oxygen chemical potential metal float bath and the oxide glass-ceramic precursor melt would be significant.

SUMMARY OF THE INVENTION

In accordance with the present invention, a float glass process for production of high melting temperature glasses is provided which utilizes a metal bath having the combined properties of low melting point, low reactivity with oxygen, low vapor pressure, and minimal reactivity with the silicate glasses being formed. The metal bath of the invention is an alloy of two metals or of a metal and a metalloid which together provide the required combination of features. A metal alloy float medium in accordance with the invention satisfies the following requirements: (1) the liquid alloy is exothermic and stable down to the relatively low temperatures needed for float processing, (2) the "solvent" metal (the one present in the greater amounts in the alloy) is noble or relatively "noble," i.e., does not readily form an oxide, whereas the solute metal can be less noble, but not excessively so, (3) the vapor pressure of both components is low enough under processing temperature conditions to prevent deleterious vapor deposition (less than $10^{-6}$ atmospheres at 1000° to 1500° C.), and (4) there is minimal chemical and interdiffusive interaction of either component with silicate glasses under the kinetic conditions of float processing, e.g., a contact time of the float medium and the glass ribbon of approximately 5 minutes. In accordance with the invention, the thermochemical and thermophysical properties are satisfied with selected exothermic alloys of the group 11 metals gold, silver or copper as solvent metals and the group 14 elements silicon, germanium, or tin as the solute, preferably at or near eutectic compositions.

Exemplary float baths in accordance with the foregoing criteria include an alloy of gold with 25–35% germanium by weight, which has a melting point below about 500° C. Gold is among the most noble of elements and shows no thermodynamic tendency to oxidize under float processing conditions. Germanium has moderate oxidative potential, and liquid Au—Ge alloys can be kept relatively "scum-free" on the exposed surface of the bath using the standard industrial techniques of maintaining a forming gas atmosphere over the liquid bath. The vapor pressures of both components at the elevated temperatures required for processing high temperature glasses are comparable to that of tin used in the conventional float process for NCS glass. Alloys of gold with the group 14 elements silicon and tin have comparable properties. Alloys of silver and copper as solvents with the group 14 elements germanium, silicon and tin melt at temperatures above 600° C. but are still applicable to float processing involving high strain point glasses, such as those used for flat panel display screens. Although the solvent metals silver and copper are not as noble as gold, they are sufficiently so as to make oxidation prevention relatively trivial by the use of appropriate forming gas atmospheres over the bath. Each of these systems may be utilized at temperatures sufficiently greater (e.g., more than 200° C. greater) than that which may be utilized with pure tin. Reduction of the amount of the exposed metal free surface can additionally reduce the vapor losses of the metal.

With regard to the fourth criterion above, in accordance with the invention it is determined that the alloys of the invention allow the kinetic response to be rate limited by the diffusivities of cations in the glass melt. Because gold atoms are large and show little affinity for oxygen, they do not diffuse readily into silicates. Germanium forms an oxide that is very similar in structure to silicon dioxide, the backbone of silicate glasses. Like silicon in silicates, germanium atoms are tightly bonded to the oxygen atoms and do not diffuse rapidly. Thus, while germanium may react with and diffuse into the glass melt to a small extent, significant damage is not done to the final glass melt material. Similarly, silicon in gold-silicon alloy baths and tin in gold-tin baths may diffuse into the glass melt, but not rapidly. Such baths are particularly useful for borosilicates glasses of the type requiring high temperature processing. Other bath metal alloys which may be used include copper-germanium, copper-silicon, silver-germanium, and silver-silicon.

In the apparatus of the present invention a float bath enclosure is provided in accordance with conventional float processing manufacturing techniques in which the liquid metal bath in accordance with the invention is contained. The bath is maintained at a temperature adjacent its entrance end which is above 1100° C., typically 1200° C. or greater, with a temperature gradient toward the cool exit end of the bath, which is maintained at a lower temperature which is cool enough to allow hardening of the glass melt sheet and which is above the melting temperature of the alloy. The melt bath alloys of the invention have the capacity of having a vapor pressure at the elevated temperatures required, e.g., 1200° C. or more, which is generally equal to or less than that of conventional pure tin melt baths at a temperature of 1100° C.

Further objects, features and advantages of the invention will be apparent from the following detailed description when taken in conjunction with the accompanying drawings.

DETAILED DESCRIPTION OF THE INVENTION

Figure 1:
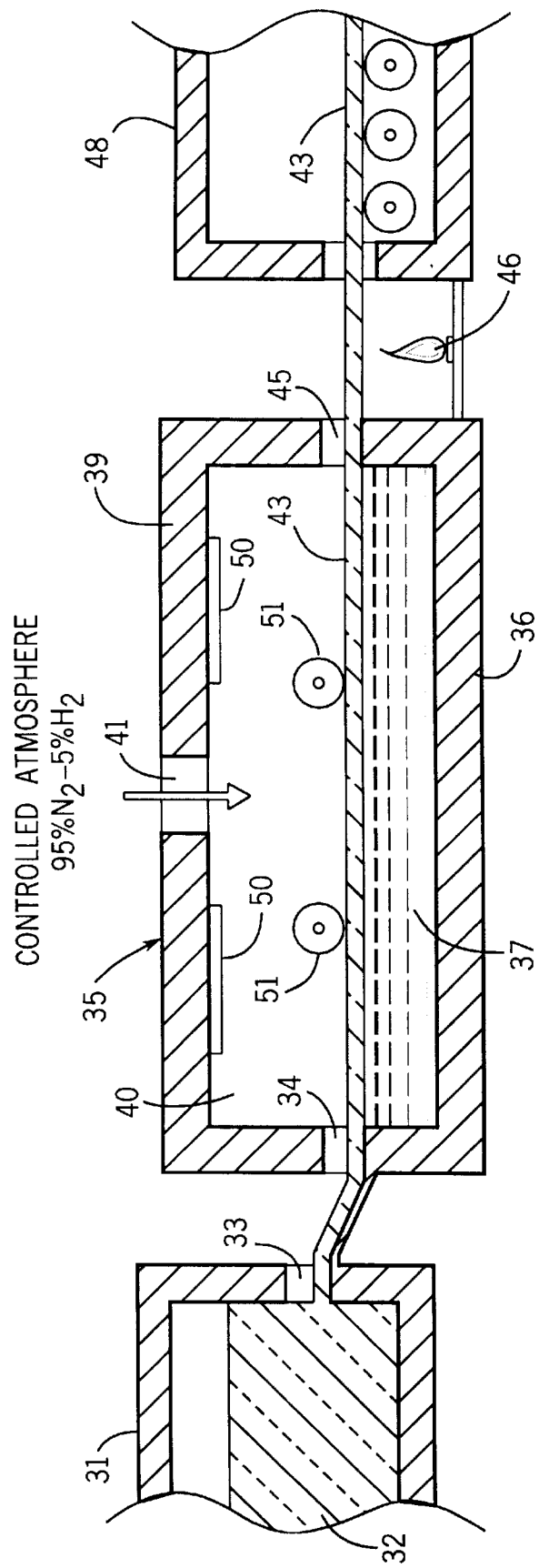
FIG. 1 is a schematic diagram of float processing apparatus in which the invention may be incorporated.

For purposes of illustrating the invention, a schematic diagram of apparatus for carrying out the float process in which the present invention may be incorporated is shown generally at 30 in FIG. 1. The apparatus 30 includes a glass melting tank/furnace 31 in which glass forming material 32 is heated to a molten state. The molten glass passes from the glass melt through an outlet 33 into an entrance 34 of a float bath enclosure 35. The enclosure 35 has a refractory lined tank 36 which contains the liquid metal bath 37, and a top enclosure 39 which defines, with the tank, an enclosed space 40 in which a controlled atmosphere is maintained, typically by supplying a "forming gas" (e.g., 95% $N_2$ and 5% $H_2$) through an inlet 41 under positive pressure. The ribbon of glass 43 which forms on the bath 37 passes through an outlet 45 at which a flame curtain 46 is maintained to burn off the $H_2$ from the forming gas, and the ribbon 43 passes into an annealing lehr 48 where it is subjected to a controlled annealing and cooling process. Within the float bath enclosure 35, overhead electrical heating elements 50 provide controlled heating of the liquid metal float bath 37 and the formed glass ribbon 43. Top rollers 51 are used to engage the ribbon 43 to move it through the float bath at a controlled rate. All of the apparatus described above is of conventional construction and is illustrated for purposes of exemplifying the invention.

The present invention is capable of forming glasses having a higher melting temperature than the NCS glasses conventionally produced by the float process, particularly glasses and glass-ceramic precursors which require temperatures for the float bath near the entrance 34 of the float bath above 1100° C., in the range of 1200° C. to 1500° C. rather than 1100° C. conventionally used with pure molten tin as the bath for supporting an NCS glass melt. In the present invention, the liquid bath material 37 is an alloy of metals which meets four criteria: (1) the liquid alloy is exothermic and stable down to the relatively low temperatures needed for float processing, (2) the "solvent" metal (the one present in the greater amounts in the alloy) is noble or relatively noble, i.e., does not readily form an oxide, whereas the solute metal can be less noble, but not excessively so, (3) the vapor pressure of both components is low enough under processing temperature conditions to prevent deleterious vapor deposition (e.g., less than $10^{-6}$ atmospheres at 1000° C. to 1500° C.), and (4) there is minimal chemical and interdiffusive interaction of either component with silicate glasses under the kinetic conditions of float processing, e.g., a contact time of the float medium and the glass ribbon of approximately 5 minutes. These thermochemical and thermophysical properties are satisfied with alloys of the group 11 (new IUPAC format) metals gold, silver or copper as the solvent metal with the group 14 elements silicon, germanium or tin as the solute, and preferably in eutectic compositions to minimize the melting temperature of the alloy.

There are advantages to floating the glass to be formed on a liquid metal alloy with an oxidizable component that acts as a network former in the silicate glass as compared to floating the glass on an alloy containing an element that oxidizes only to network modifier cations (such as Sn). Such network forming cations include $Ge^{4+}$ and $Si^{4+}$, which bond covalently to oxygen. The bond strength of $Ge^{4+}$ is nearly equal to $Si^{4+}$. Studies of $Ge^{4+}$ diffusion in fused silica show that, like $Si^{4+}$, this bonding environment results in a very low intrinsic mobility for $Ge^{4+}$. In addition, Ge oxidizes to $Ge^{4+}$ much more readily than does Sn to $Sn^{4+}$. The increased driving force for the reaction for the glass melt to locally incorporate $Ge^{4+}$ or $Si^{4+}$ as a network former further reduces deleterious chemical modifications to the near-surface composition of the glass.

The invention is illustrated with respect to the following examples although the invention is not limited to the particular examples set forth herein.

Figure 2:
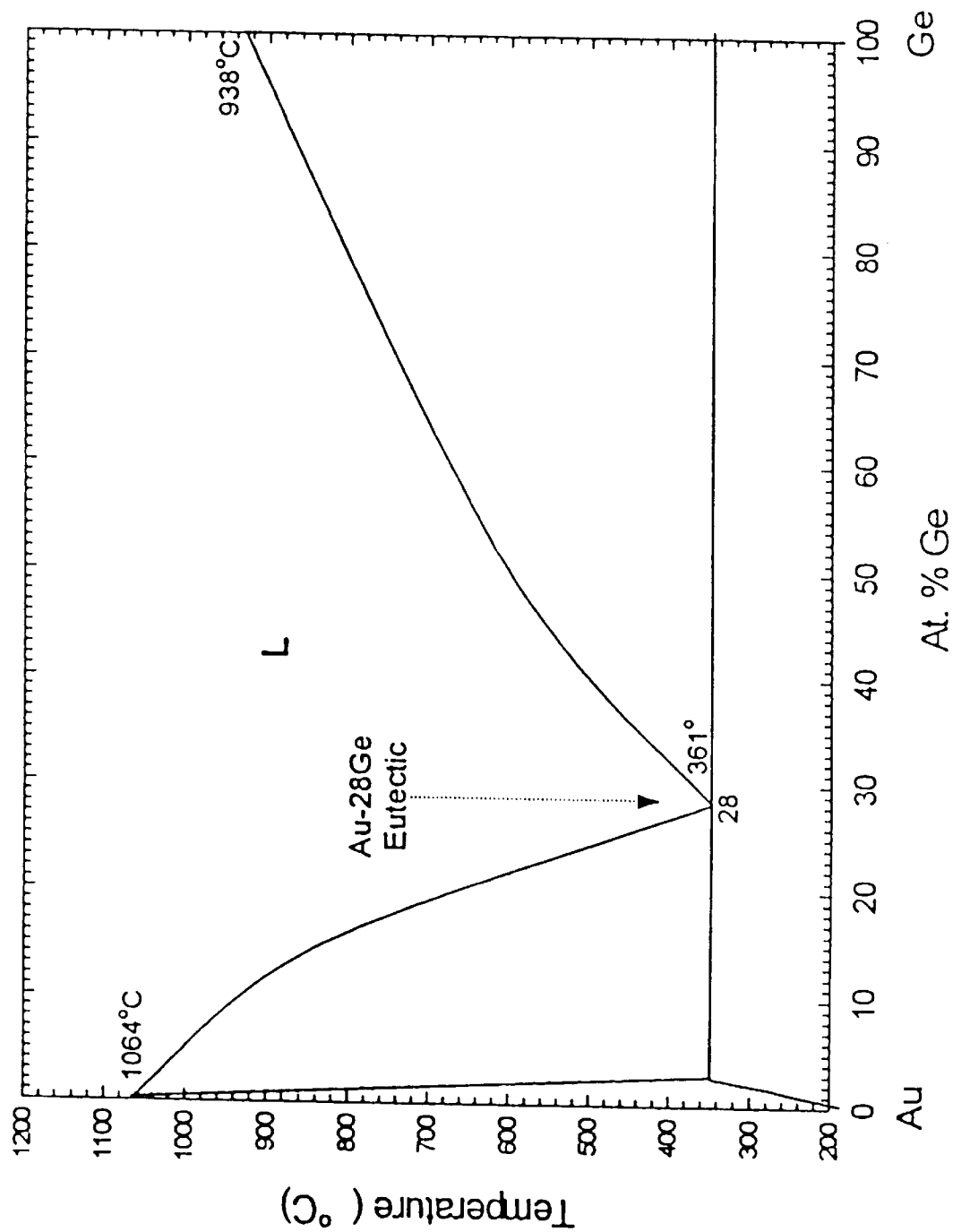
FIG. 2 is a phase diagram for the alloy system AuGe.
Figure 3:
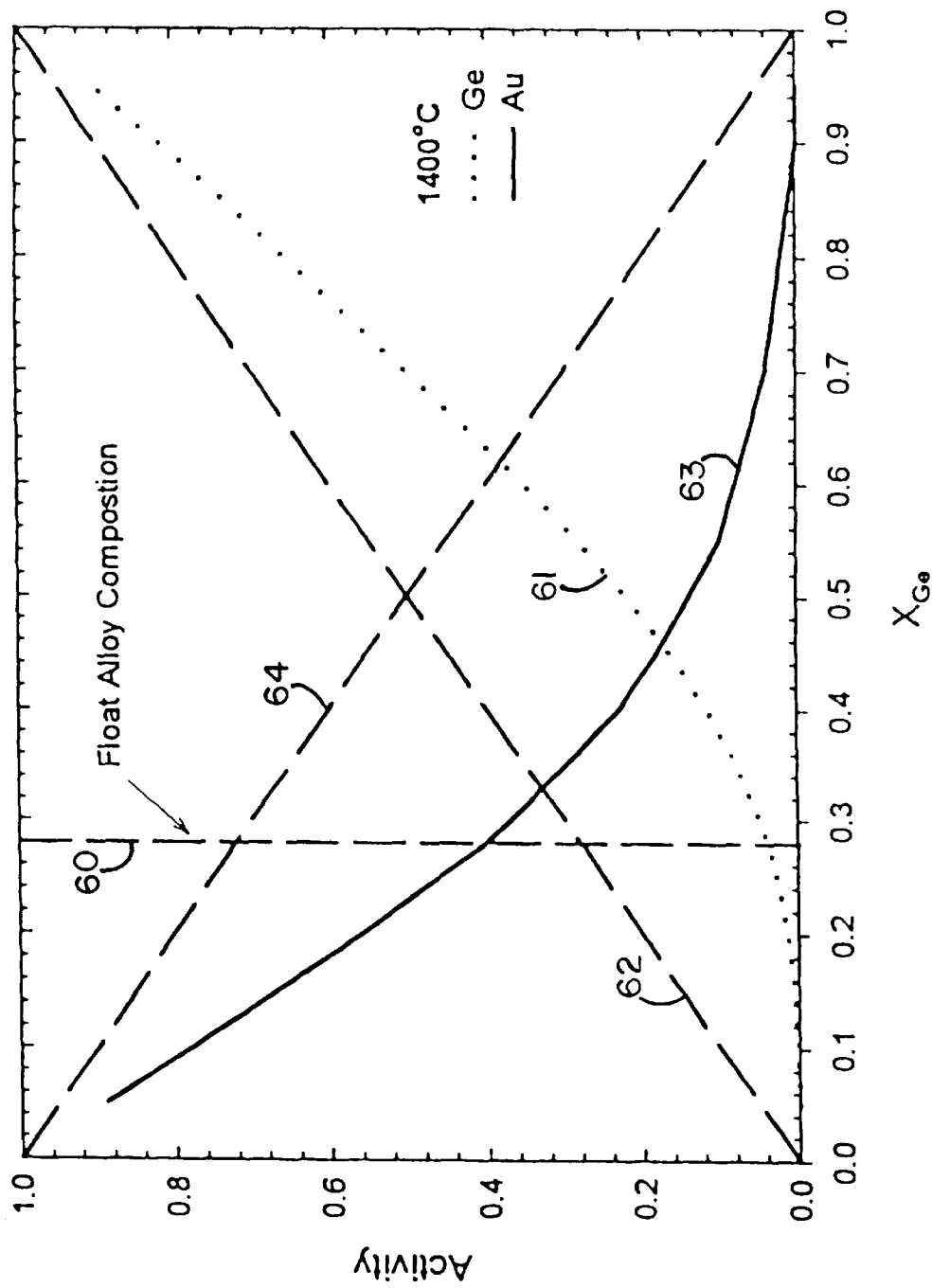
FIG. 3 are diagrams illustrating the activities of Au and Ge in alloys from 0.5 to 0.95 mole fraction Ge at 1400° C.
Figure 4:
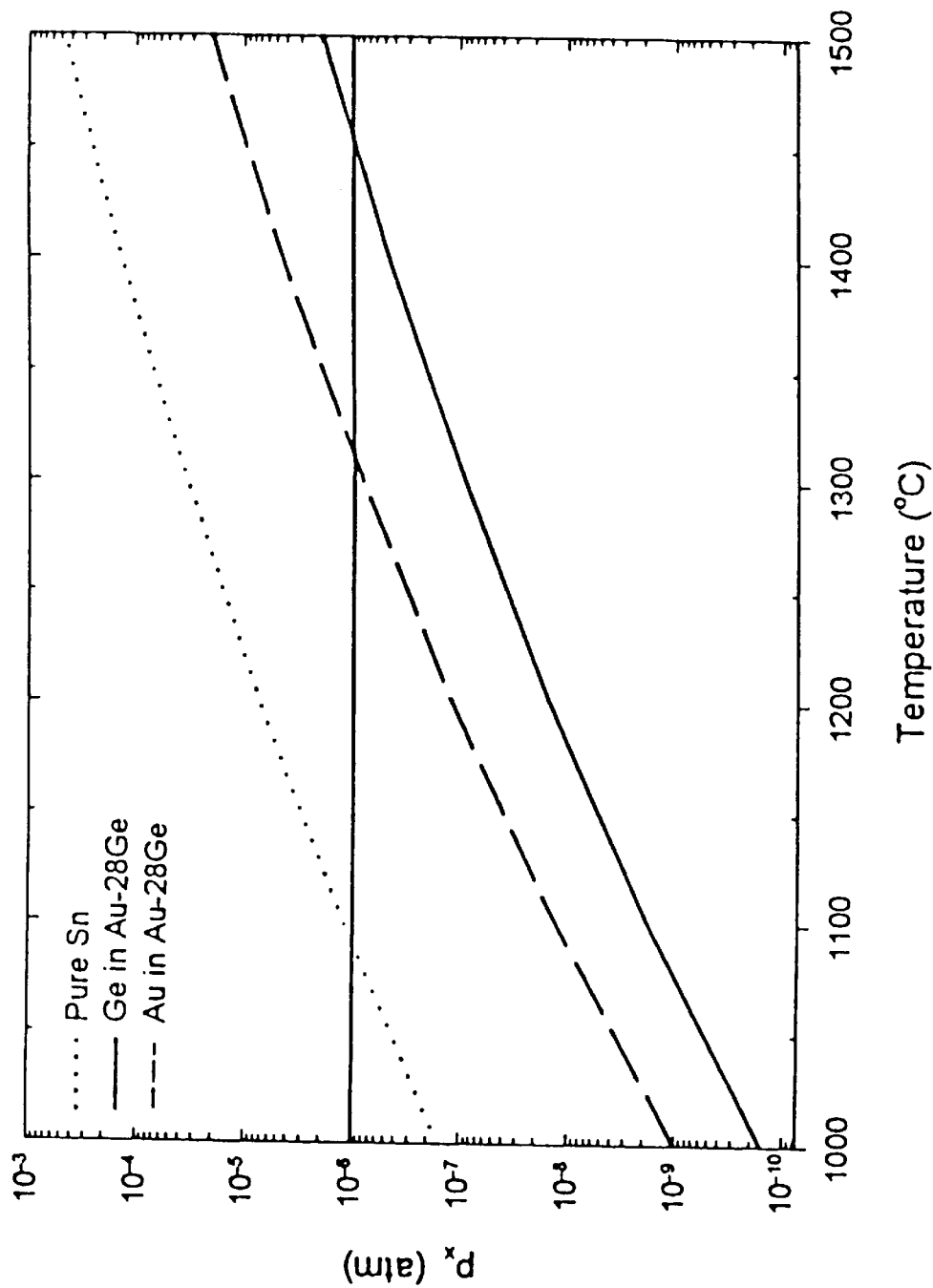
FIG. 4 are diagrams illustrating the partial pressures of Ge and Au over liquid Au—28Ge as a function of temperature and also as compared to the saturated vapor pressure for Sn over its liquid.
Figure 5:
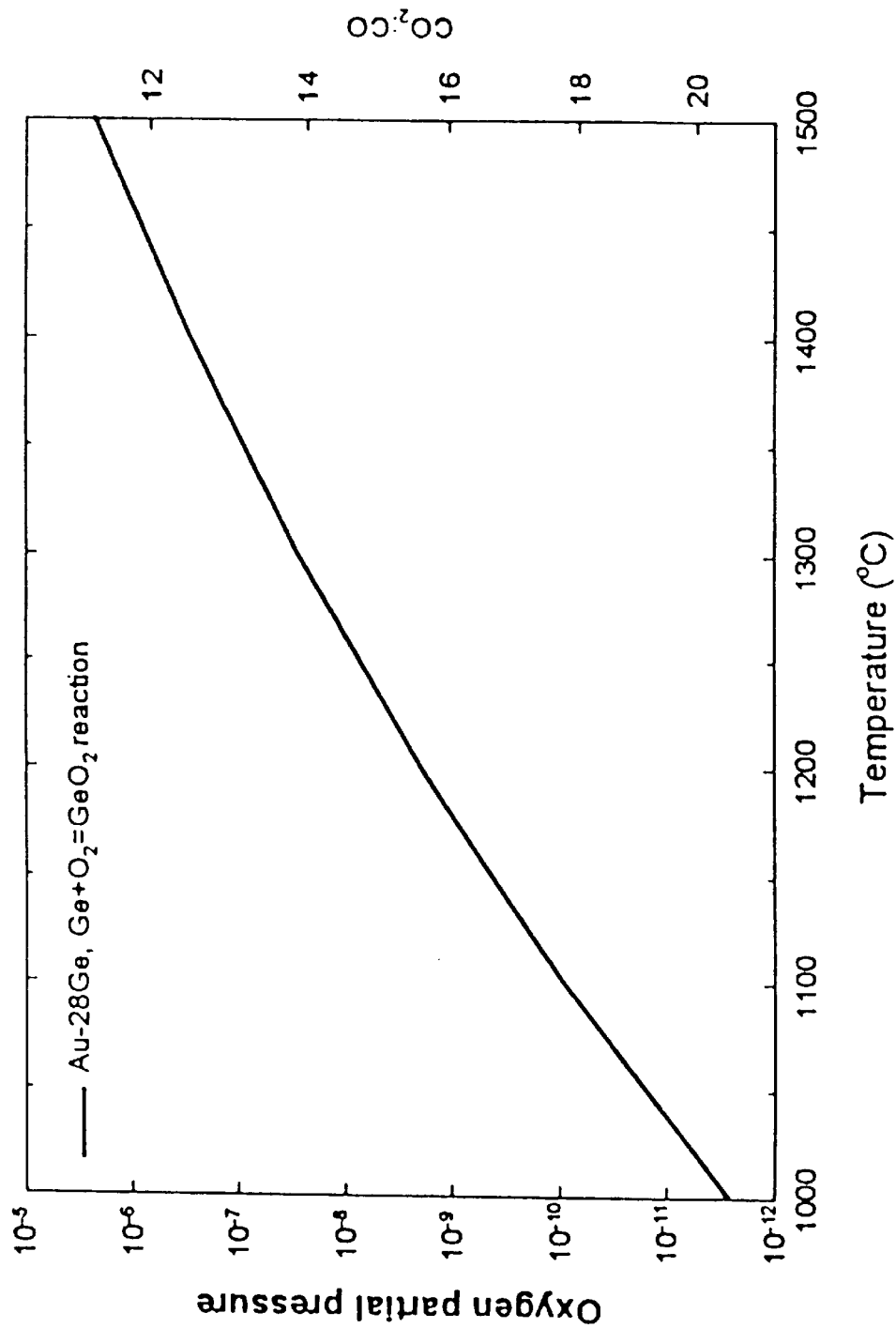
FIG. 5 is a diagram illustrating the equilibrium oxygen activity for the Ge—$GeO_2$ reaction of a liquid Au—28Ge alloy as a function of temperature with the equilibrium mixtures of CO and $CO_2$ to achieve the oxygen activity for that alloy indicated on the right-hand axis.

A phase diagram for the alloy system Au—Ge is shown in FIG. 2. The eutectic composition at 28 at %Ge has a melting point temperature of 361° C. The deep depression of the liquidus line down to the eutectic reaction at Au—28Ge is indicative of a liquid solution distinctly more stable than the high temperature solids or solid solutions. The deep eutectic results from a large, negative enthalpy of mixing for the liquid—i.e., the liquid solution is strongly exothermic, such that the activities of the solution components will be characterized by large negative deviations from ideal behavior. This provides the desired conditions to reduce both the vapor pressure of the float medium and its reactivity with a molten silicate/aluminosilicate. The values of the activities of Au and Ge in liquid solutions at 1400° C. are shown in FIG. 3. For the eutectic composition Au—28Ge, at the line labeled 60 in FIG. 3, the activity of Ge as represented by the line 61 is reduced from the ideal value represented by the line 62 by 85%, i.e., from 0.28 down to 0.04, while the activity of Au, represented by the line 63, is depressed from the ideal value 64 by almost 50%. The corresponding decreases in vapor pressure over a range of potential float processing temperatures are shown in FIG. 4. Note that the vapor pressure of Ge remains below $10^{-6}$ atm (the level above which production difficulties are encountered in conventional float processing on molten Sn) to about 1450° C. The oxygen partial pressure needed to prevent oxidation of the float alloy is shown in FIG. 5. It is seen from this diagram that the alloy can easily be protected against oxidation of the Ge component using a $CO_2$:CO ratio of $\leq 12$. The equilibrium mixtures of CO and $CO_2$ to achieve that oxygen activity for that alloy is indicated on the right-hand axis of FIG. 5. Because of the sharp valley in the liquidus line bottoming at the eutectic composition, it is generally preferred that the eutectic alloy be used. However, an alloy that is off eutectic that meets the requirements of sufficiently low vapor pressure at the temperature of the entrance end of the bath and is liquid at the exit end temperature may be used.

The following examples are presented to exemplify the invention with reaction couple experiments with two iron bearing borosilicate melts in contact with a float bath in accordance with the invention. A first standard sodium aluminoborosilicate (NABS) glass of the "Pyrex™" (Corning code 7740) composition, designated herein "PT," contained 0.006 at %Fe. The source of this material was a commercially prepared rod. The second NABS glass, designated "ST," contained 0.08 at %Fe. The compositions of the two NABS glasses PT and ST are given in Table 1 and the physical properties of these glasses are summarized in Table 2.

TABLE 1

Chemical compositions of NABS glasses PT and ST*

| | PT | | | ST | | |
|---|---|---|---|---|---|---|
| Oxide | wt. % | mol. % | at. (ion) %† | wt. % | mol. % | at. (ion) %† |
| $SiO_2$ | 81.14 | 83.45 | 25.66 | 82.31 | 84.72 | 26.09 |
| $B_2O_3$ | 12.70 | 11.28 | 6.94 | 12.40 | 11.02 | 6.79 |
| $Al_2O_3$ | 2.18 | 1.32 | 0.81 | 2.14 | 1.30 | 0.80 |
| $Na_2O$ | 3.93 | 3.92 | 2.41 | 2.73 | 2.72 | 1.68 |
| $Fe_2O_3$ | 0.018 | 0.007 | 0.004 | 0.280 | 0.108 | 0.067‡ |
| FeO | 0.007 | 0.006 | 0.002 | 0.054 | 0.046 | 0.014‡ |
| CaO | 0.00 | 0.00 | 0.00 | 0.03 | 0.03 | 0.01 |
| MgO | 0.00 | 0.00 | 0.00 | 0.02 | 0.02 | 0.01 |

TABLE 1-continued

Chemical compositions of NABS glasses PT and ST*

| | PT | | | ST | | |
|---|---|---|---|---|---|---|
| Oxide | wt. % | mol. % | at. (ion) %† | wt. % | mol. % | at. (ion) %† |
| $TiO_2$ | 0.01 | 0.01 | 0.00 | 0.03 | 0.02 | 0.01 |
| O | | | 64.17 | | | 64.53 |
| | | % Fe as $Fe^{3+}$ = 70 | | | % Fe as $Fe^{3+}$ = 82 | |

*Major element oxide content determined from x-ray fluorescence; $Fe^{2+}$:$Fe^{3+}$ determined by wet chemical titration (Characterization Science and Services, Corning, Inc., Corning, NY).
†Data shown are for the cations in the oxide; $O^{2-}$ compositions are given in the bottom row.
‡Fe compositions were additionally analyzed via WDS with electron microprobe; careful calibration for Fe gave the total Fe concentration in glass ST as 0.042 atomic percent.

TABLE 2

Physical properties of borosilicate glasses PT and ST

| | PT | ST |
|---|---|---|
| Density (g · $cm^{-3}$) | 2.23 | 2.25 |
| CTE ($10^{-7}$ · ° C.) | 33 | 27.7 |
| Viscosity - Pa · s [poise] | Temp (° C.) | |
| Strain Point - $10^{13.5}[10^{14.5}]$ | 525 | 524 |
| Annealing Point - $10^{12}[10^{13}]$ | 574 | 579 |
| Softening Point - $10^{6.6}[10^{7.6}]$ | 817 | 839 |
| $10^5[10^6]$ | 957 | 1006 |
| $10^4[10^5]$ | 1078 | 1151 |
| $10^3[10^4]$ | 1255 | 1352 |
| $10^2[10^3]$ | 1510 | 1649 |

An Au—28Ge alloy was prepared from 99.9 wt. % pure Au coinage or splatter shot (about 0.5–2 mm diameter) mixed with 99.999% pure Ge (Alfa Aesar # 00850) which was in the form of less than 10 mesh powder. A mechanical mixture of the Au and Ge was melted in an alumina crucible in a tube furnace at 1300° C. under a flowing mixture of CO and $CO_2$ at a ratio of 3:1 for one hour, a time sufficient for the surface of the molten alloy to appear to be free of all oxides. The alloy was allowed to cool to room temperature under the controlled atmosphere. To allow the reaction couples to be comparable chemically to material produced in a float-processing environment, a vertical tube furnace was modified to permit the controlled reacting and cooling of a glass melt in contact with a pristine (oxide-free) liquid metal surface contained within a reducing atmosphere. A refractory cradle, instrumented with a thermocouple, supported a 25 mm internal diameter $Al_2O_3$ crucible that served as the float tank. The crucible contained the approximately 2 $cm^3$ float alloy and the glass specimen. The cradle can be translated rapidly and smoothly within the sealed tube, via low resistance O-ring seals and low-friction linear bearings, such that the float bath/glass melt system can achieve the rapid heating and cooling necessary for appropriate reaction studies. Each glass specimen was a cylindrical disk, 16 mm in diameter and 5 mm thick, fire polished on both bases and fused into a 25 mm-diameter, 5 mm thick mullite containment ring. The ring prevents the glass melt from wetting the alumina float well. The Au—28Ge alloy showed very little wetting of the $Al_2O_3$ crucible, imparting substantial meniscus curvature to the liquid metal surface, whereas without the mullite ring gravity caused the glass to flow downhill into the sides of the crucible. A specimen was placed on the rim of the float tank supported there by a small alumina rod. After assembly of the cradle/float tank/specimen system, the furnace tube was sealed, and the tube thoroughly purged of air by flowing a 3:1 mixture of CO and $CO_2$ at 80 $cm^3$-min. With the gas flowing in the furnace hot zone temperature idling at about 1500° C., the cradle was positioned about 13 cm above the hot zone. Here oxide was cleaned from the liquid alloy surface at about 800° C. for 20 minutes. Reduction of the oxide was confirmed by visual inspection of the float alloy surface. The cradle was then lowered into the hot zone of the furnace over about 60 seconds. An alumina rod entering the furnace through a glass-type port in the bottom tube seal was used to remove the support rod. The specimen thus dropped onto the float bath, beginning the reaction. A suite of experiments was performed at reaction temperatures of 1300°, 1350°, 1400° and 1450° C. for 30 minutes. At the completion of the experiment, the cradle was moved down out of the hot zone, bringing the sample on the assembly to 700° C. in about 90 seconds. The tube was then opened and the cradle lowered out the bottom of the tube, and the rigid glass (contained in the mullite ring) was picked off the still-liquid alloy.

Chemical composition profiles, from the metal/glass interface into the glass, that resulted from the reactions were characterized by Rutherford backscattering spectroscopy (RBS), which characterizes to a high spatial resolution in depth the chemistry of the first several $\mu m$ of the glass, and wavelength-dispersive x-ray emission spectroscopy on an electron microscope (WDS/EMPA) which, on cross-sectional specimens, can probe chemistry to substantial depth.

Figure 6:
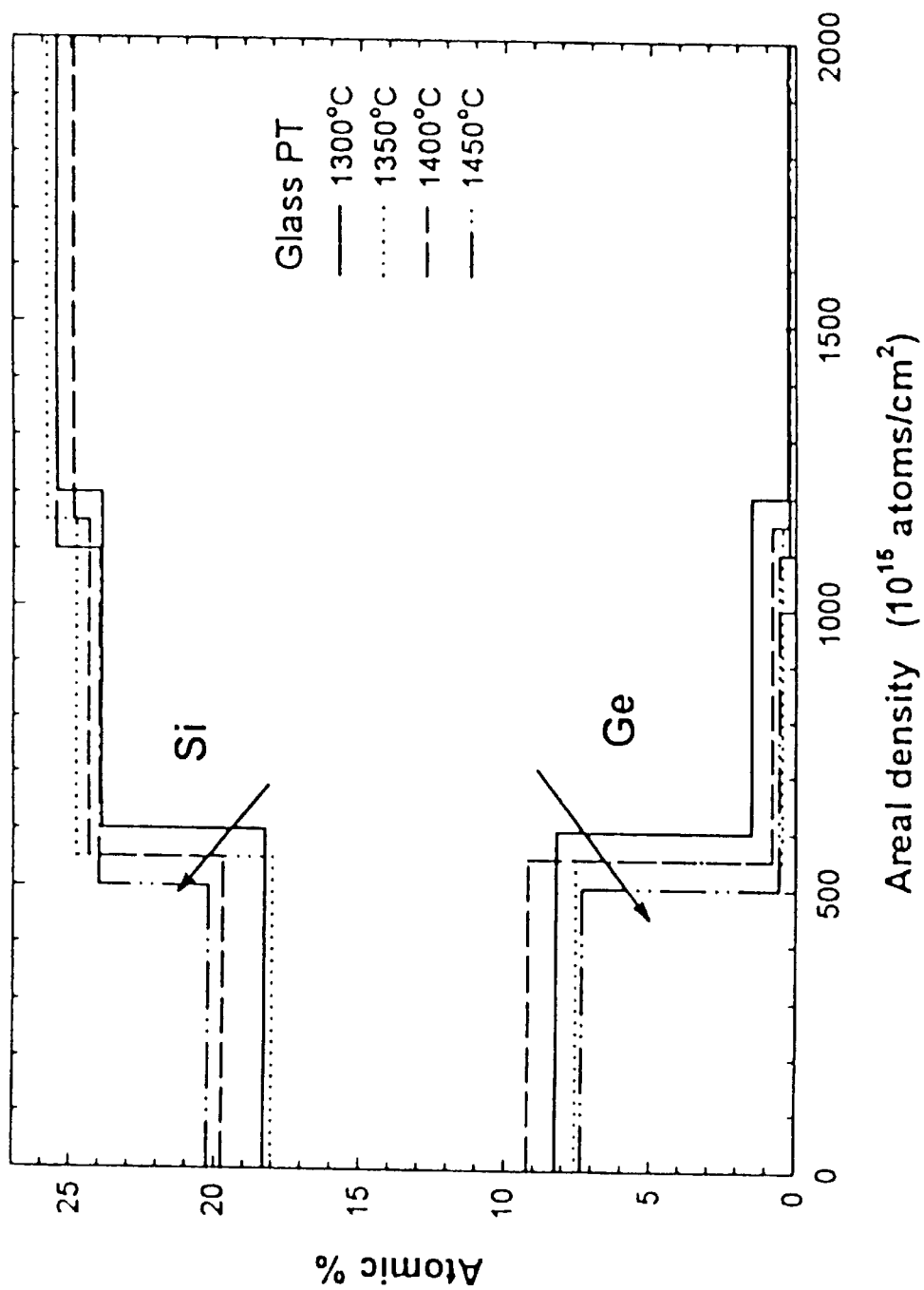
FIG. 6 are diagrams illustrating the composition profiles for an exemplary glass "PT" reacted for 30 minutes on Au—28Ge with the length scale of areal density as a molar-density-normalized units of depth from RDS.
Figure 7:
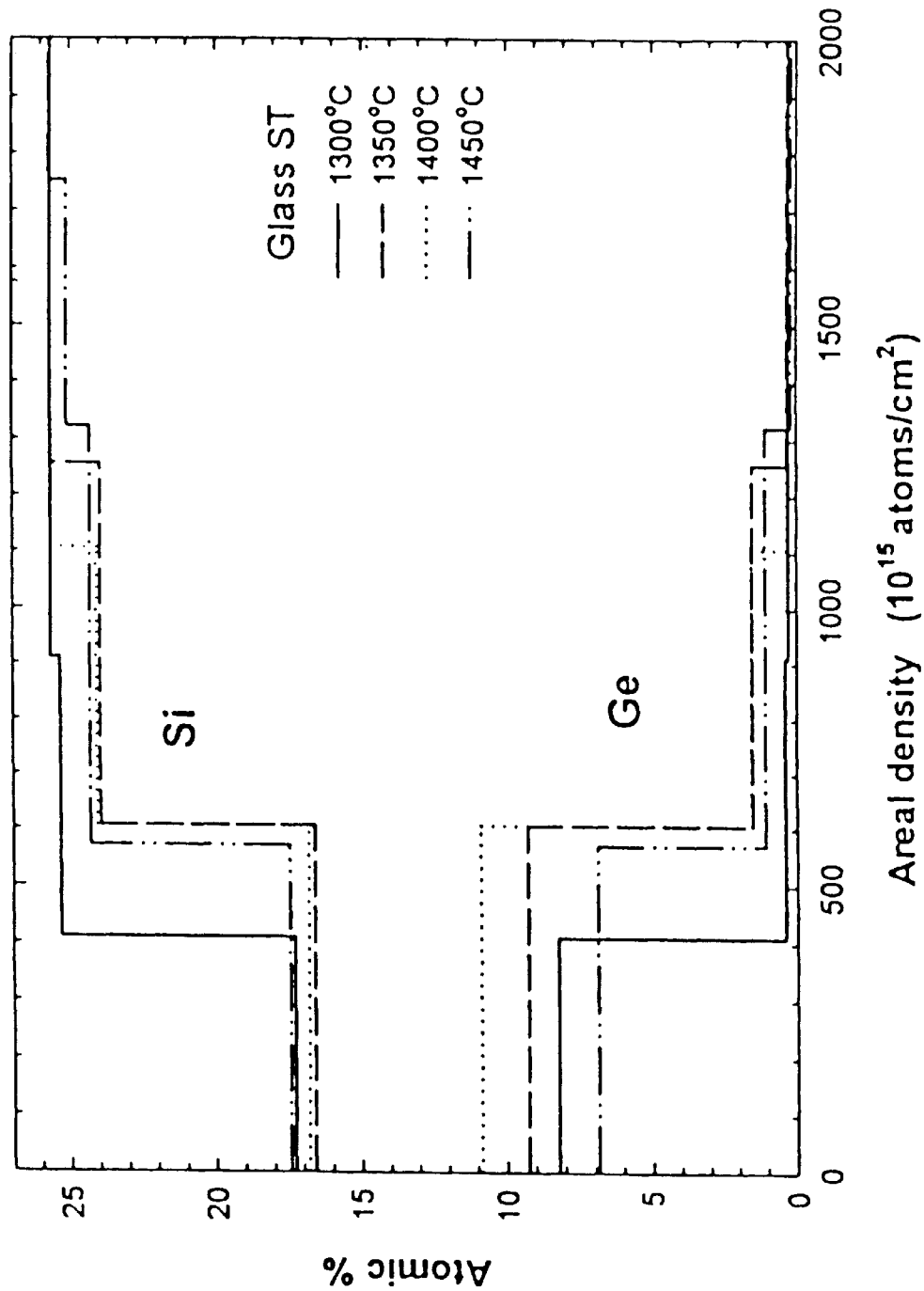
FIG. 7 are diagrams illustrating composition profiles from RDS for another exemplary glass "ST" reacted for 30 minutes on Au—28Ge, illustrating the depletion and enrichment of Si and Ge.

FIG. 6 illustrates the composition profiles for the glass specimen PT reacted for 30 min. on an Au—28Ge float bath, using RBS. The length scale of areal density is the molar-density-normalized units of depth from RBS. The Ge-enriched Si-depleted surface layer is about 150 nm thick. The arrows indicate mirroring trends in composition with increasing temperature. FIG. 7 shows similar composition profiles for the glass ST reacted for 30 minutes on Au—28Ge.

Figure 8:
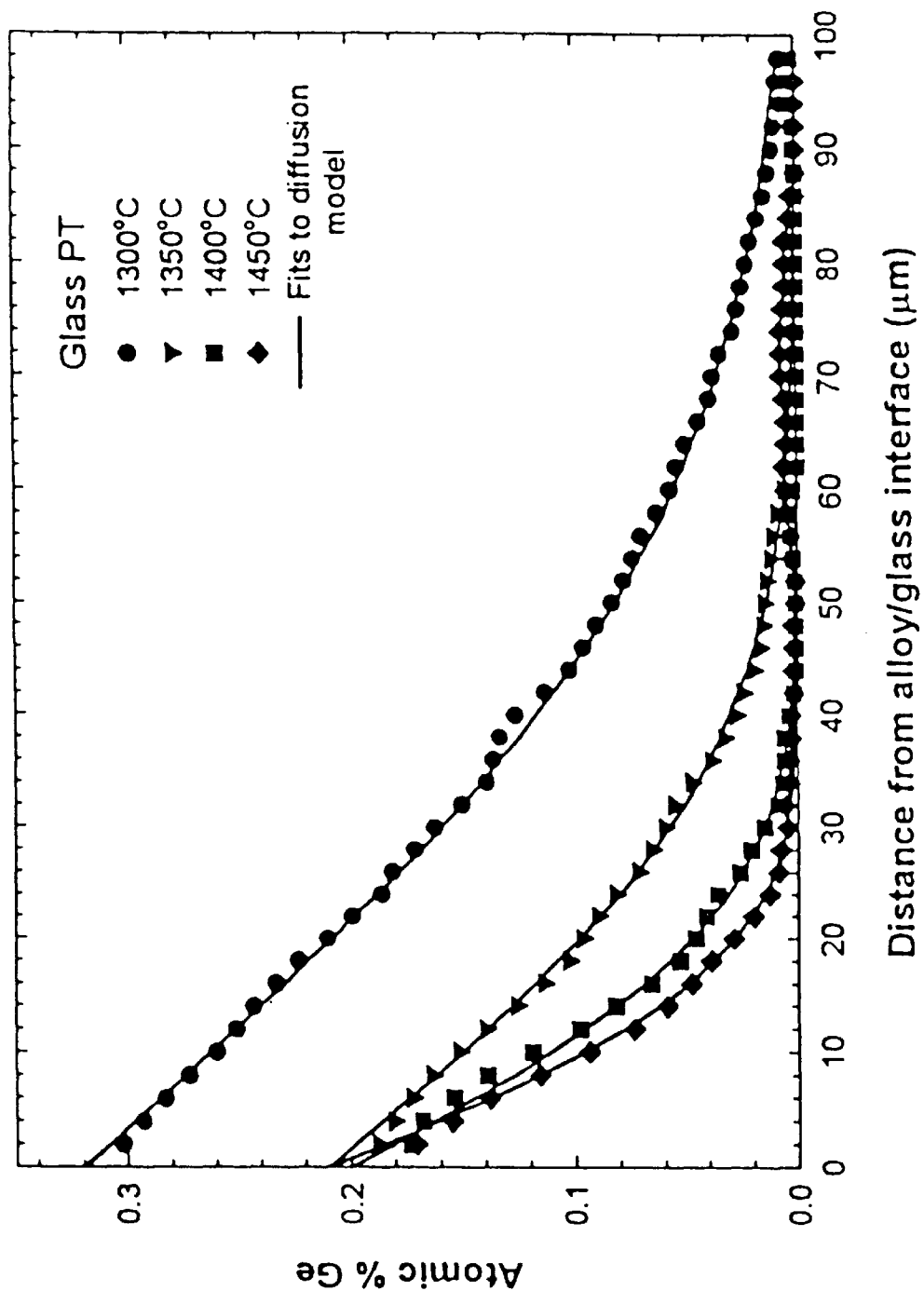
FIG. 8 are diagrams illustrating Ge concentration versus depth profiles and the respective fits to diffusion equations for an exemplary glass "PT" reacted for 30 minutes on Au—28Ge.
Figure 9:
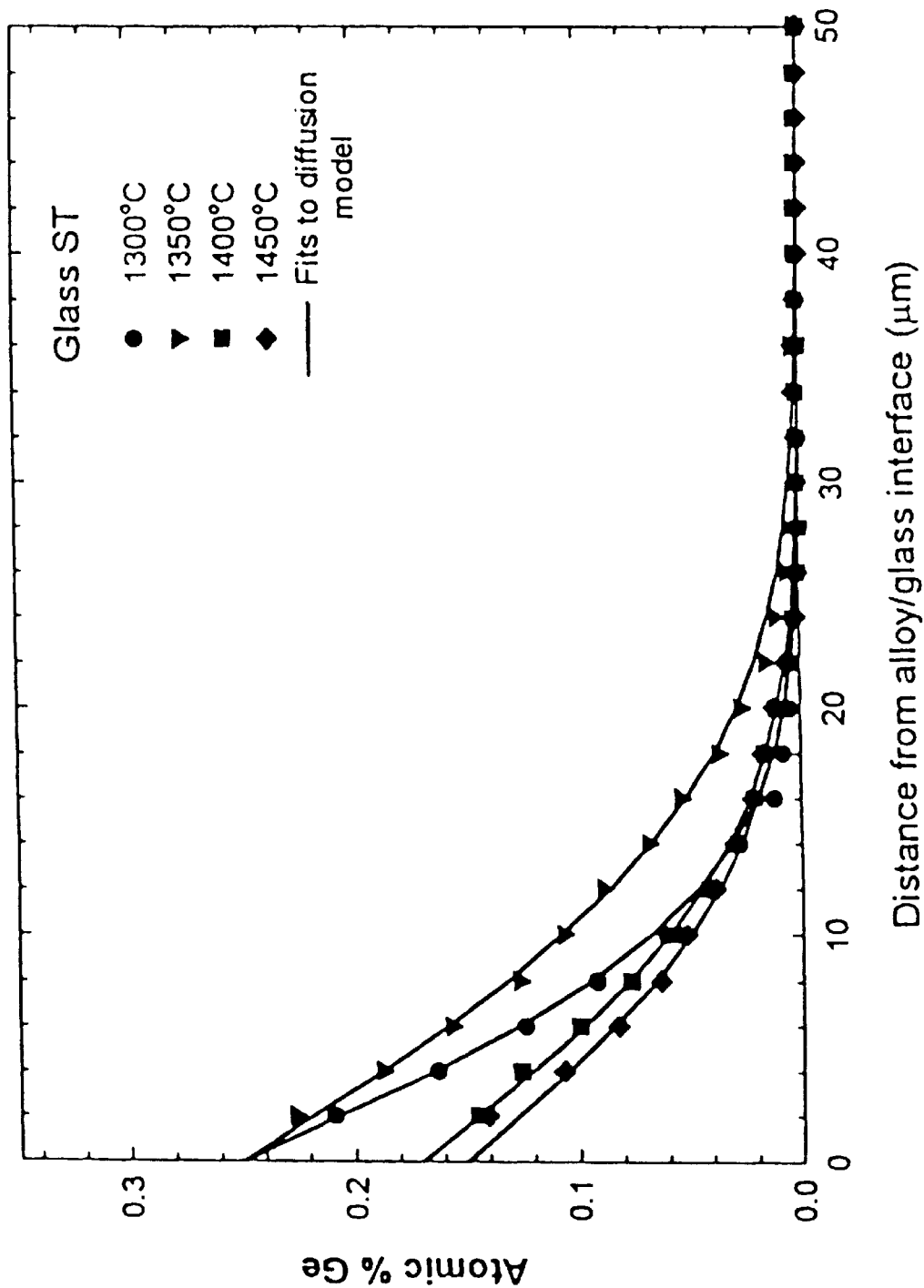
FIG. 9 are diagrams illustrating Ge concentration versus depth profiles and the respective fits to the diffusion equation for another exemplary glass "ST" reacted for 30 minutes on Au—28Ge.

Germanium concentration profiles in the reactive glass PT, as determined by WDS/EMPA, are shown in FIG. 8, and similar data for the glass ST are shown in FIG. 9. Penetration depths shown in FIG. 8 range from about 25 to 100 $\mu m$, with the total depth of penetration in the near-surface concentrations of Ge decreasing with increasing temperature. FIG. 9 shows that the corresponding profiles for the Fe bearing glass ST shows essentially constant penetration for all temperatures, but again with decreasing surface concentrations indicated for increasing temperature. These profiles can be easily fit to diffusion model equations.

Figure 10:
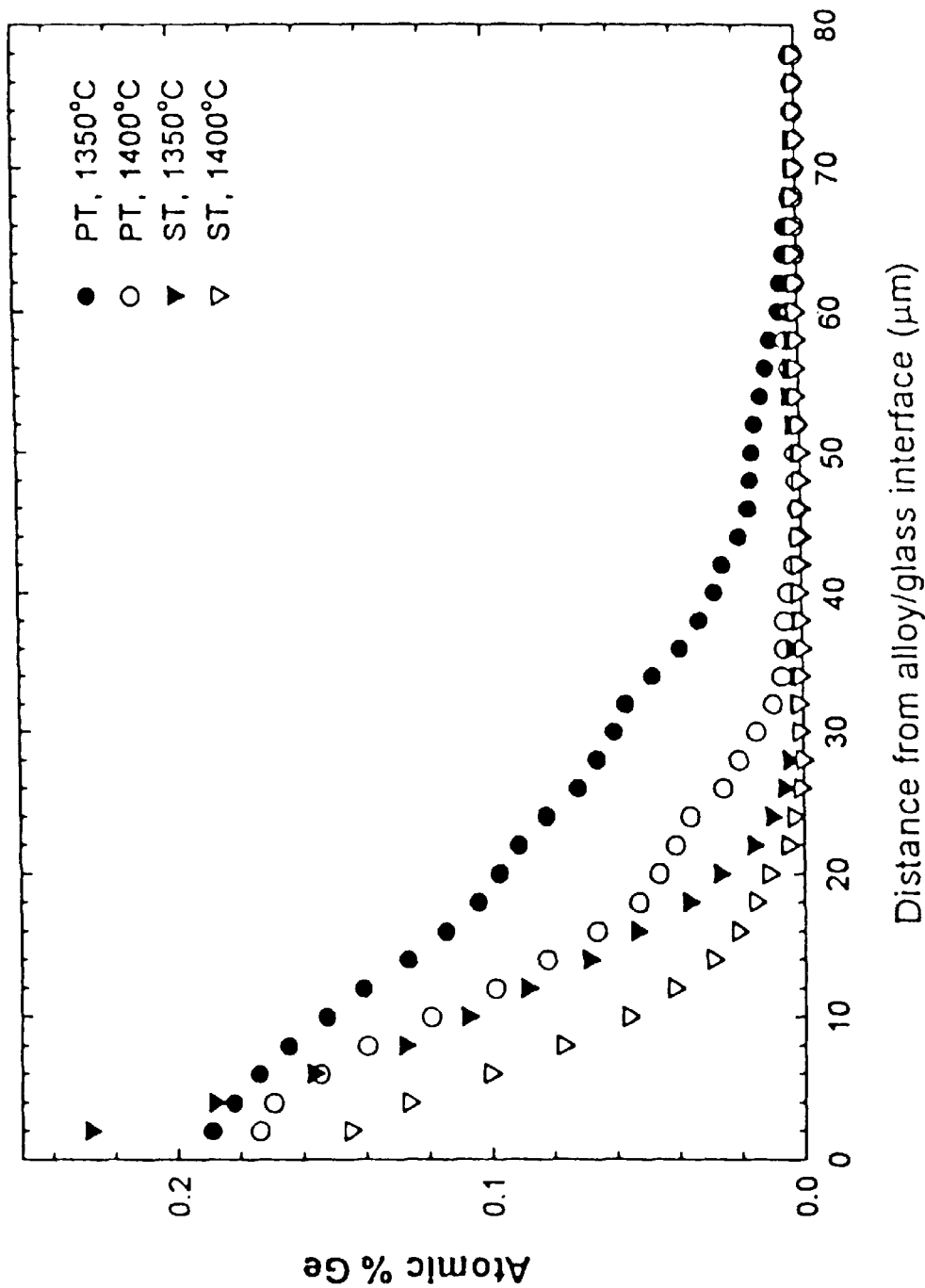
FIG. 10 are diagrams comparing the depth profiles of Ge concentration for two exemplary glass compositions PT and ST at 1350° C. and 1400° C.
Figure 11:
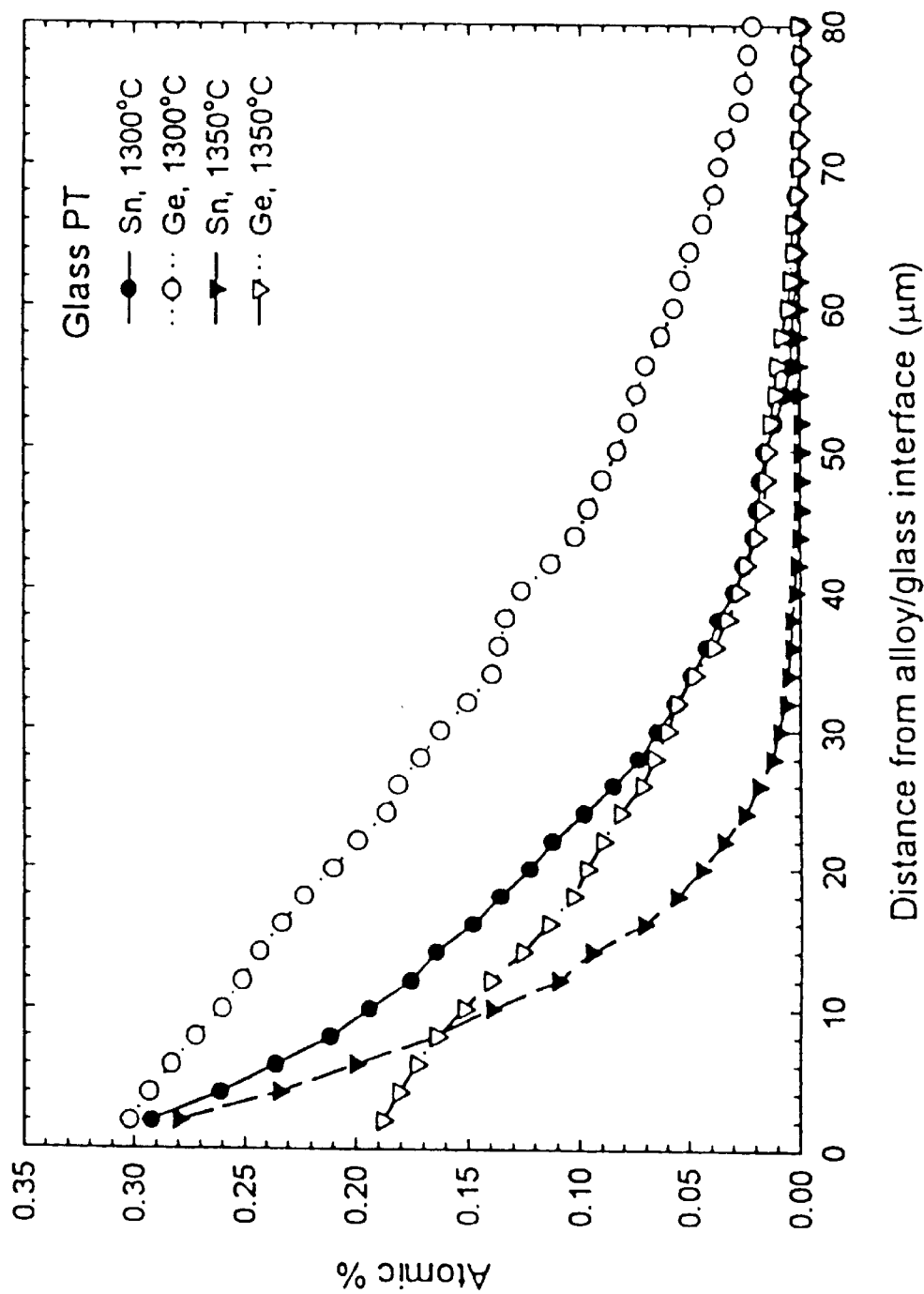
FIG. 11 are diagrams illustrating the comparison of concentration profiles of Sn in glass melts floated on Au—30Sn and for Ge in glass melts floated on Au—28Ge for an exemplary glass composition "PT".
Figure 12:
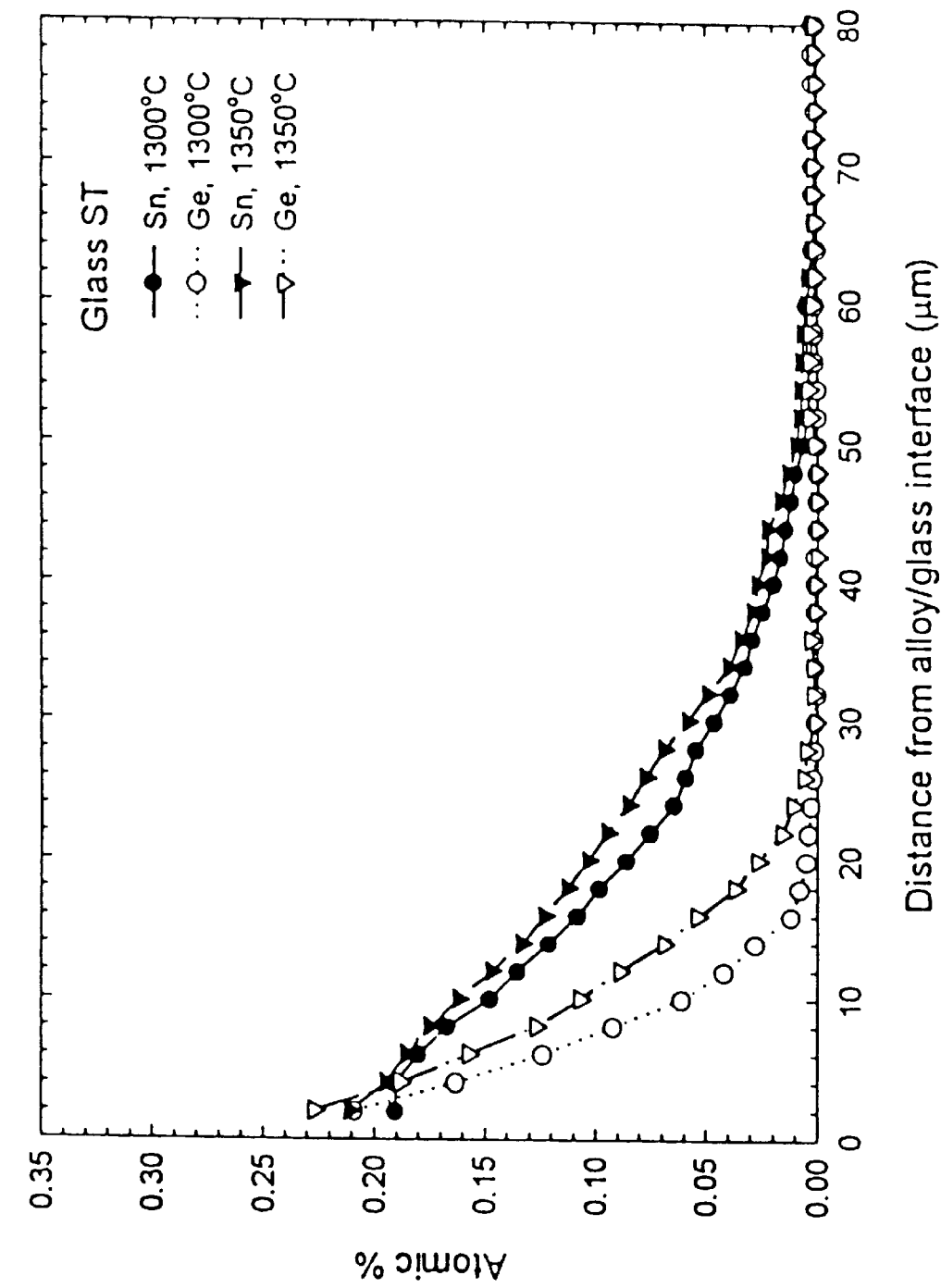
FIG. 12 are graphs illustrating the comparison of concentration profiles of Sn in glass melts floated on Au—30Sn and for Ge in glass melts floated on Au—28Ge for a another exemplary glass composition "ST".

FIG. 10 illustrate comparisons of depth profiles of Ge concentration, from WDS measurements, for the glasses PT and ST at 1350° C. and 1400° C. The effect of Fe concentration in the glass melt to reduce the uptake and the depth of penetration of Ge is apparent. The presence of Fe in the glass melt limits dramatically the total Ge penetration. The rate of Ge diffusion in the glass ST is for all temperatures constant and it is slower than even the slowest rate seen in PT. FIG. 11 illustrates comparisons of WDS concentration profiles of Sn in glass melts floated on Au—30 SN and for Ge in glass melts floated on Au—28Ge for the glass PT. FIG. 12 shows similar data for the glass ST.

It is apparent from the foregoing that, in accordance with the invention, the choice of the oxidizable alloyant (solute) in an alloy metal float medium is significant in affecting the extent of reaction between the floating glass melt and the liquid metal, and in extending the temperatures and glass compositions to which the float process can be applied. By floating on the exemplary exothermic liquid alloy of Au—28Ge, the degree of contamination of the glass melt by oxidized Ge cations in two NABS glass melts (one of which had additional Fe added), reacted for 30 min. at up to 1450° C., was limited to that seen in the conventional NCS float process which is characterized by a maximum temperature some 350° C. cooler and by a contact time an order-of-magnitude less. It was also determined that the depth of penetration of Ge into the glass melt is limited by the total $Fe^{3+}$ content of the glass melt. An increase in the $Fe^{3+}$ content of the glass strongly limited the penetration of Ge ions because any network modifier $Ge^{2+}$ was oxidized to network-forming $Ge^{4+}$, which is intrinsically less mobile.

Other alloy systems in accordance with the invention may be utilized which combined Group 11 metals with Group 14 elements and which display the requisite thermochemical and thermophysical properties required of the float medium. Alloy systems containing Si, such as Au—Si and Cu—Si have the advantage of the minimum disruption of a silicate glass structure to be expected by reaction and interdiffusion with Si. Alloys in which Cu is the solvent have the advantage of cost over Au alloys.

Figure 13:
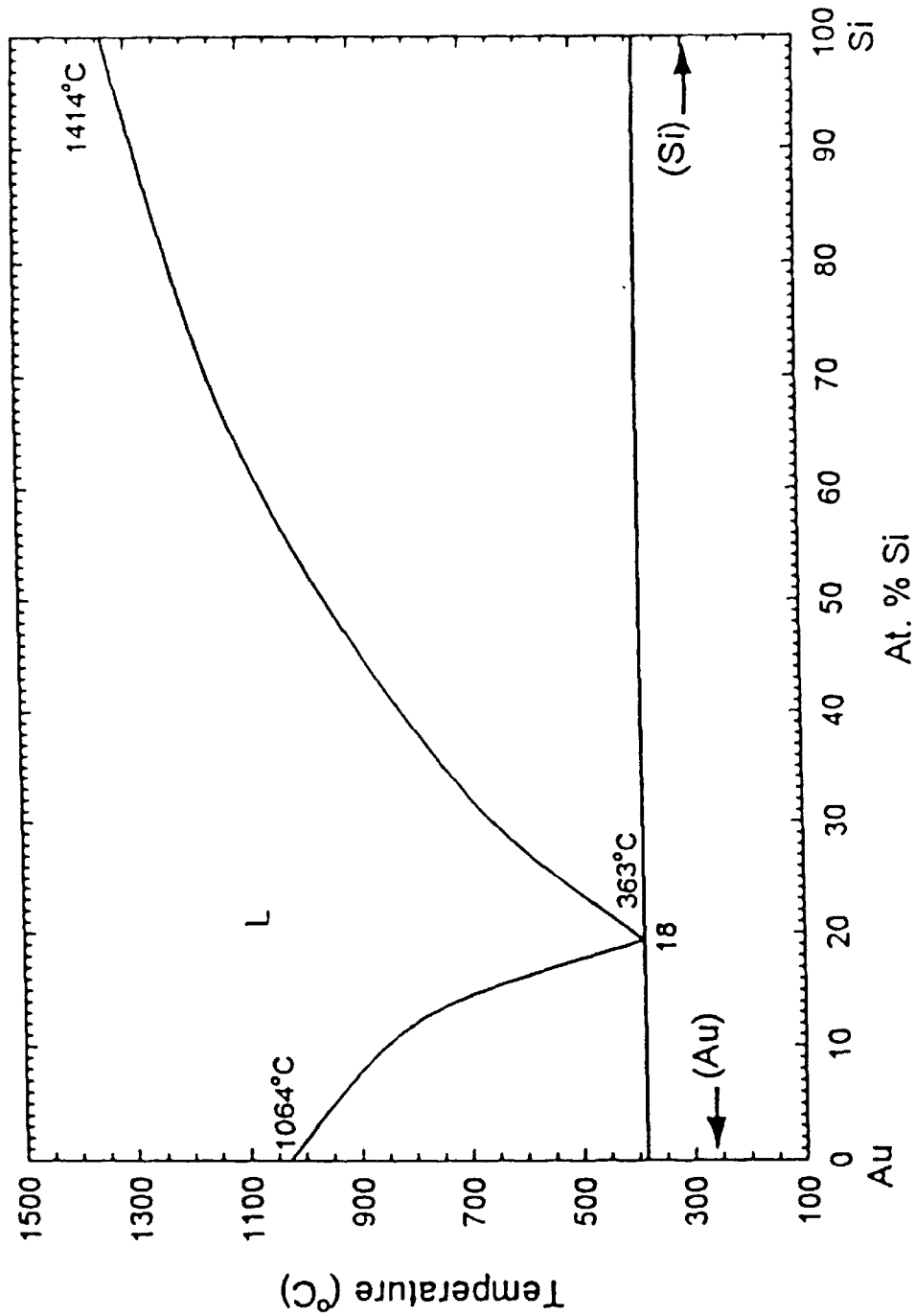
FIG. 13 is a phase diagram for the system AuSi.
Figure 14:
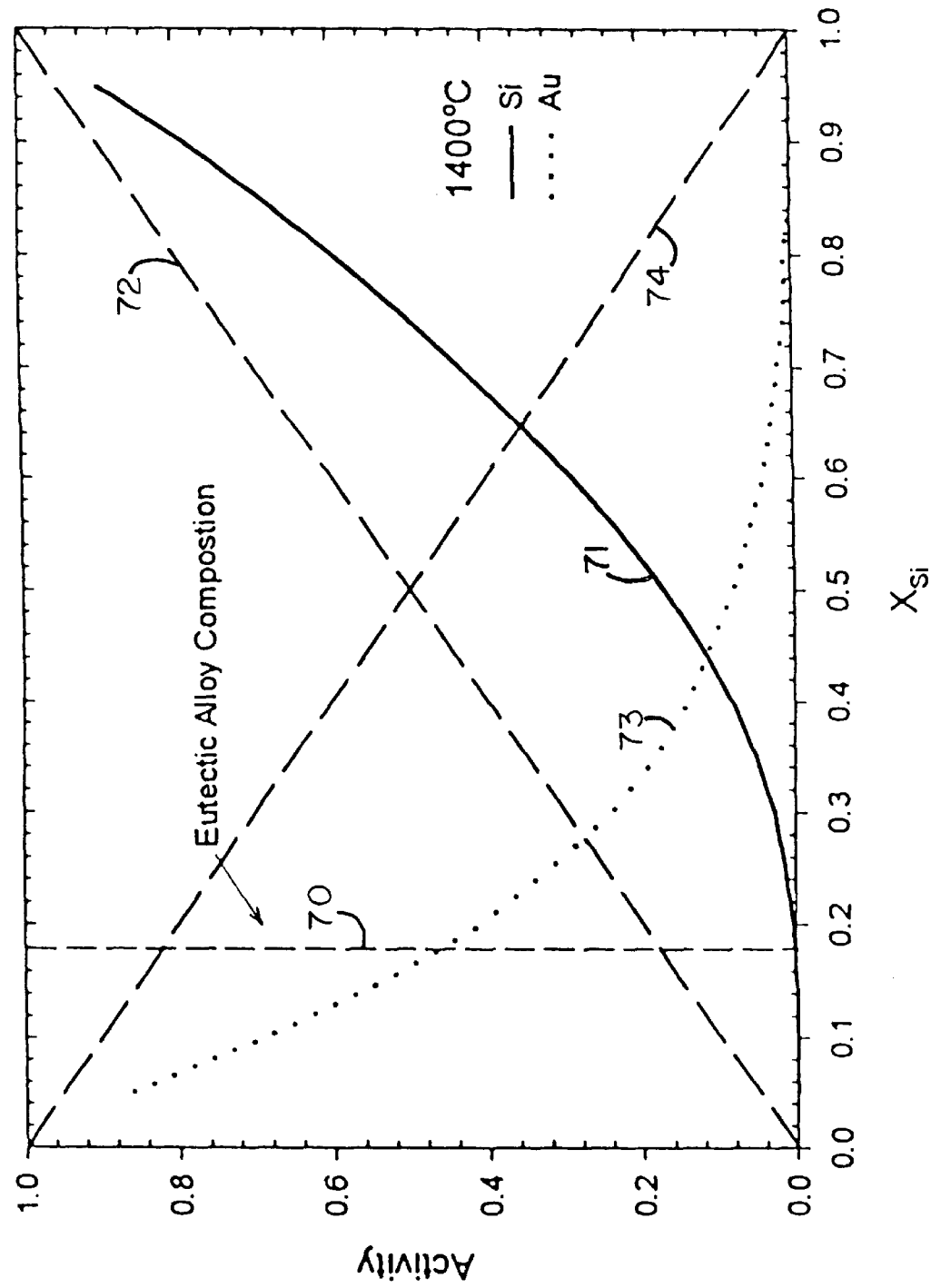
FIG. 14 are diagrams illustrating calculated chemical properties of AuSi liquid alloys indicating the activities of Au and Si in alloys at 1400° C.
Figure 15:
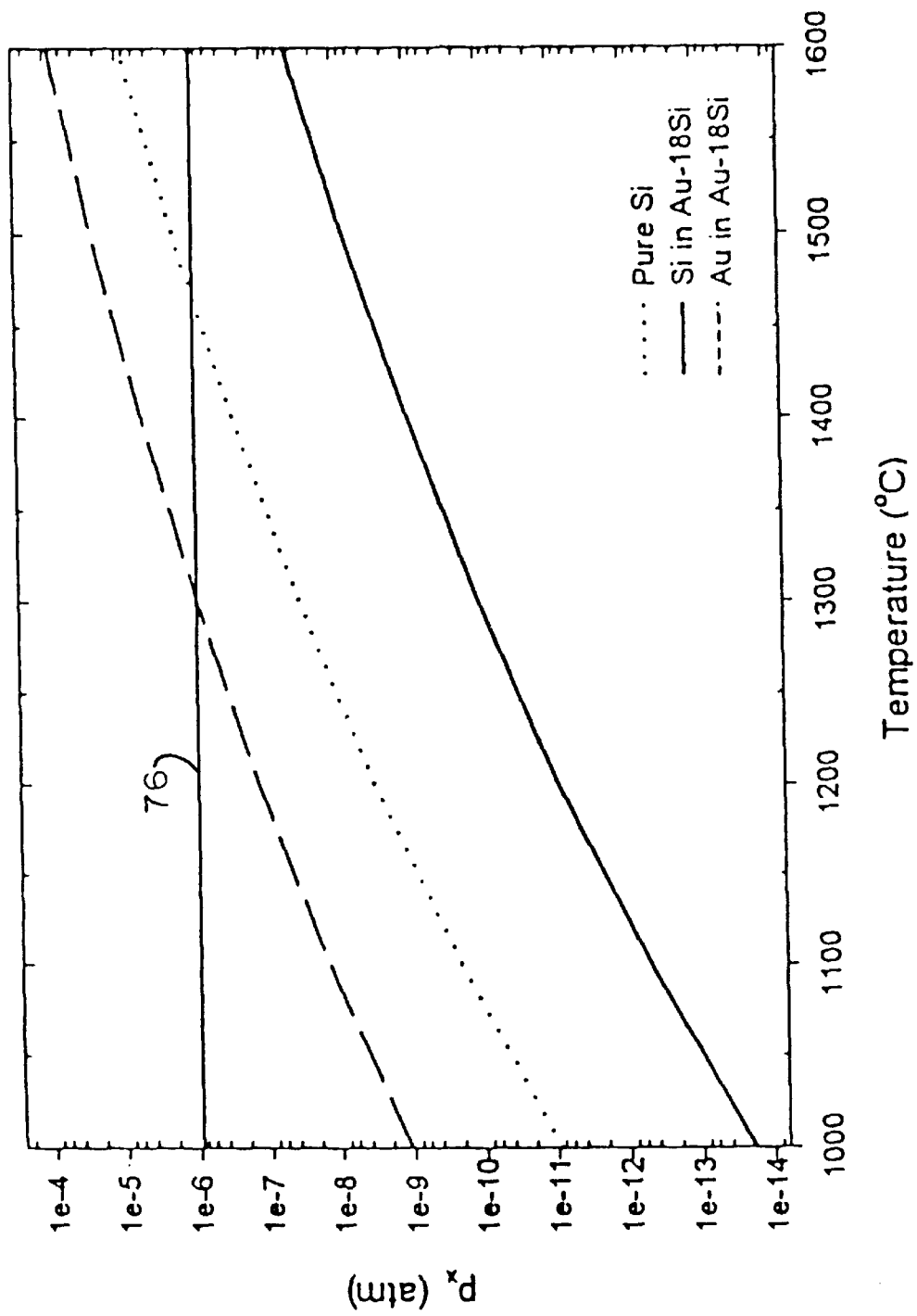
FIG. 15 are diagrams illustrating partial pressure of Si over pure molten Si compared to Si and Au over a eutectic Au—18Si alloy as a function of temperature.
Figure 16:
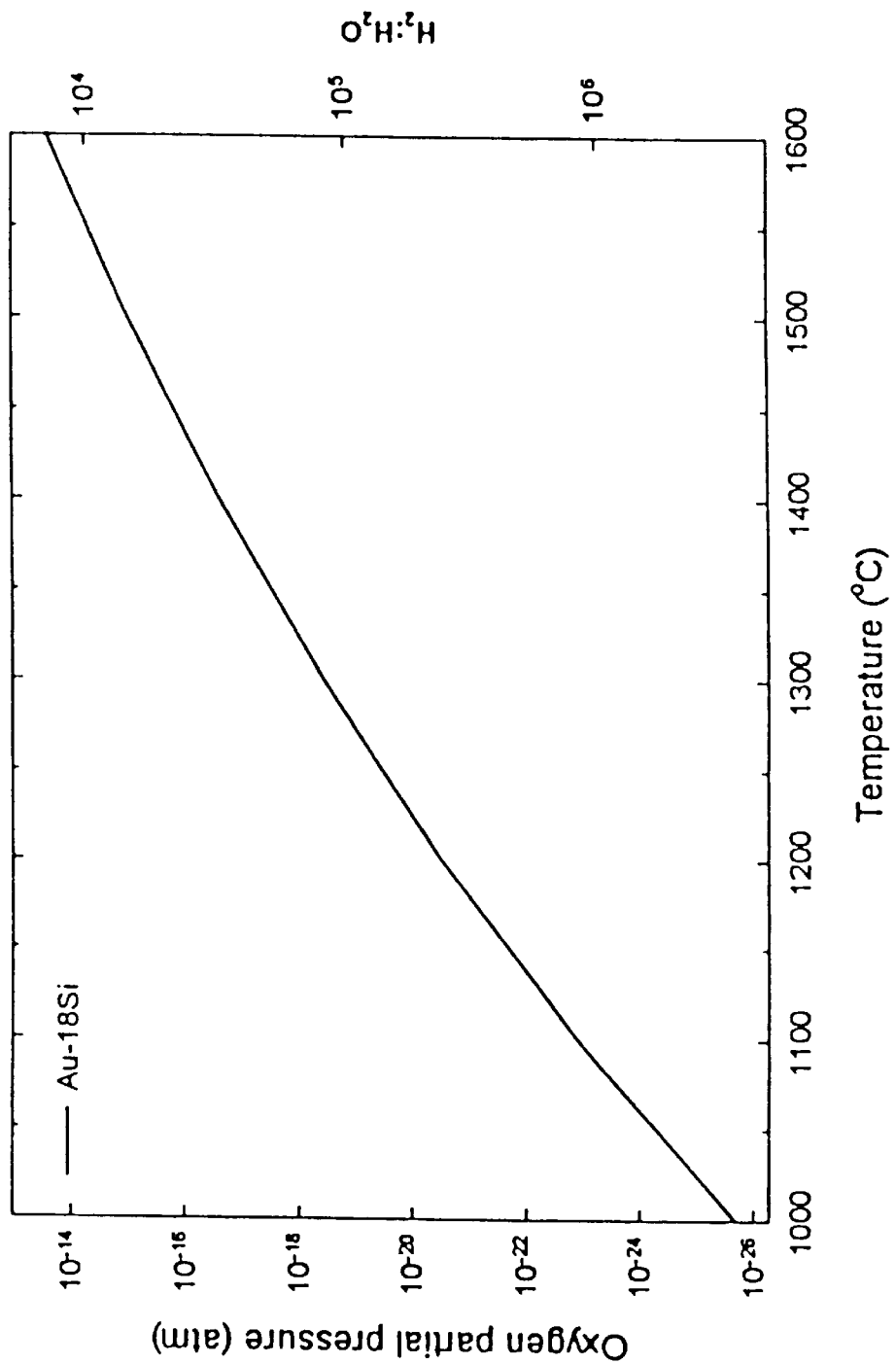
FIG. 16 is a diagram illustrating the equilibrium oxygen partial pressure and associated equilibrium mixture of $H_2$ and $H_2O$ to achieve that partial pressure for the Si—$SiO_2$ buffer over an Au—18Si alloy as a function of temperature.

The phase diagram for the alloy system Au—Si is shown in FIG. 13. The eutectic composition at 18 at. %Si, with a melting point temperature of 360° C., involves an exothermic liquid based on calculations of the solution properties of the alloy. FIG. 14 shows the calculated activities of the Au—Si liquid alloys at 1400° C. The eutectic alloy composition is indicated by the line 70, with the line 71 indicating the actual Si activities compared to the ideal activities indicated by the line 72, and with the line 73 indicating the activity for Au compared to the ideal line 74. For the eutectic composition Au—18Si at 1400° C., the activity is only 0.004 for Si, a 98% decrease from the ideal value 0.18. FIG. 15 shows the partial pressure of Si over pure molten Si compared to Si and Au over a eutectic Au—18Si alloy as a function of temperature. The line 76 at $10^{-6}$ atm. indicates the vapor pressure level postulated to display a maximum acceptable metal vapor pressure of the oxidizable float metal component based on experience from conventional float processes. FIG. 16 illustrates the equilibrium oxygen partial pressure and associated equilibrium mixture of $H_2$ and $H_2O$ to achieve that partial pressure, for the Si—$SiO_2$ buffer over an Au—18Si alloy as a function of temperature. From the data of FIG. 15, it is seen that if a vapor pressure of Si near $10^{-6}$ atm. is best for processing, then this alloy is useful to temperatures in excess of 1500° C. Because silica is such a stable oxide, however, maintaining an oxide-free float metal requires an atmosphere buffered by $H_2$ and $H_2O$ (rather dry, at around 1000: 1 $H_2:H_2O$ at 1400° C.) to achieve the needed oxygen partial pressure in the most practical way.

Figure 17:
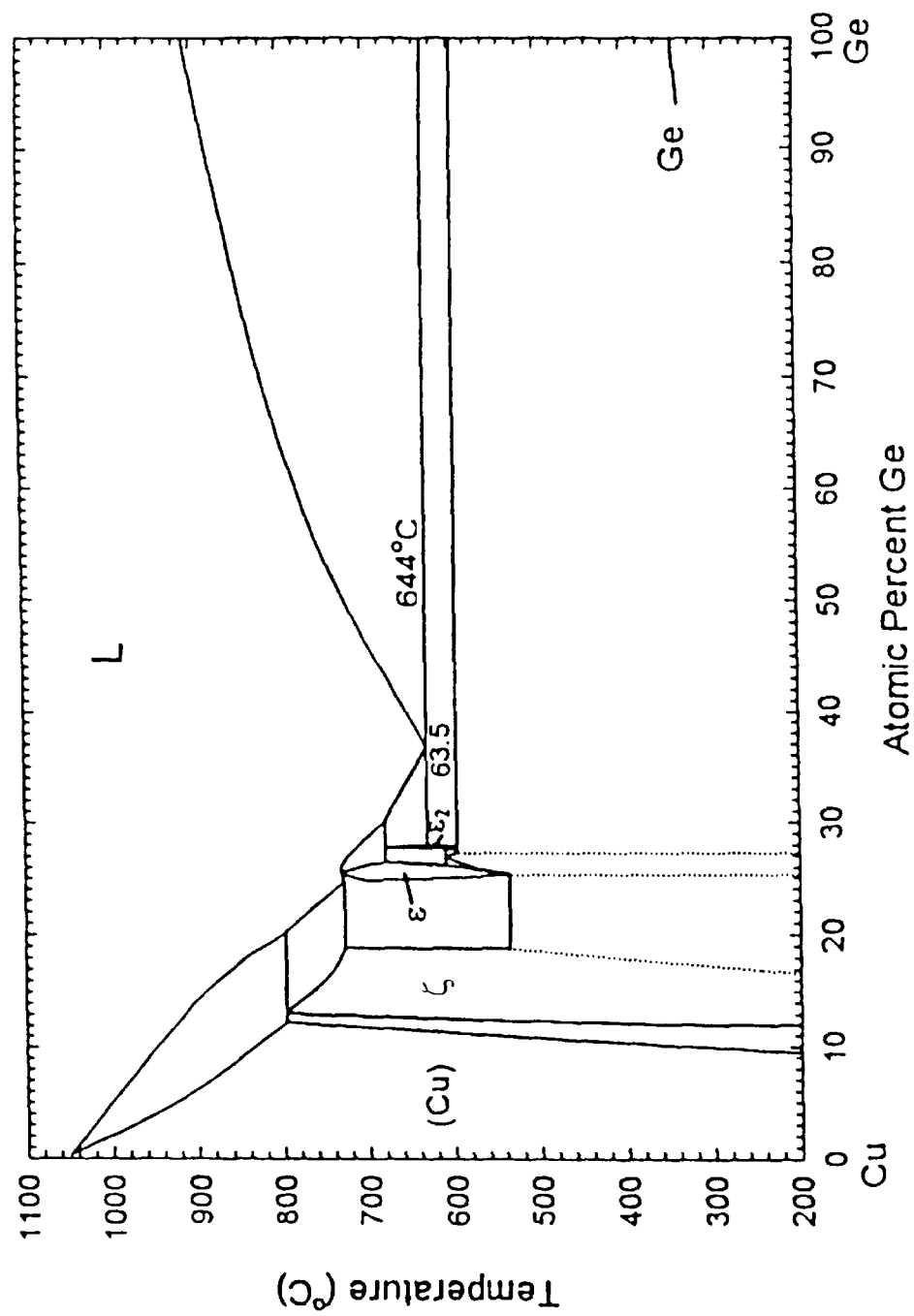
FIG. 17 is a Cu—Ge phase diagram.
Figure 18:
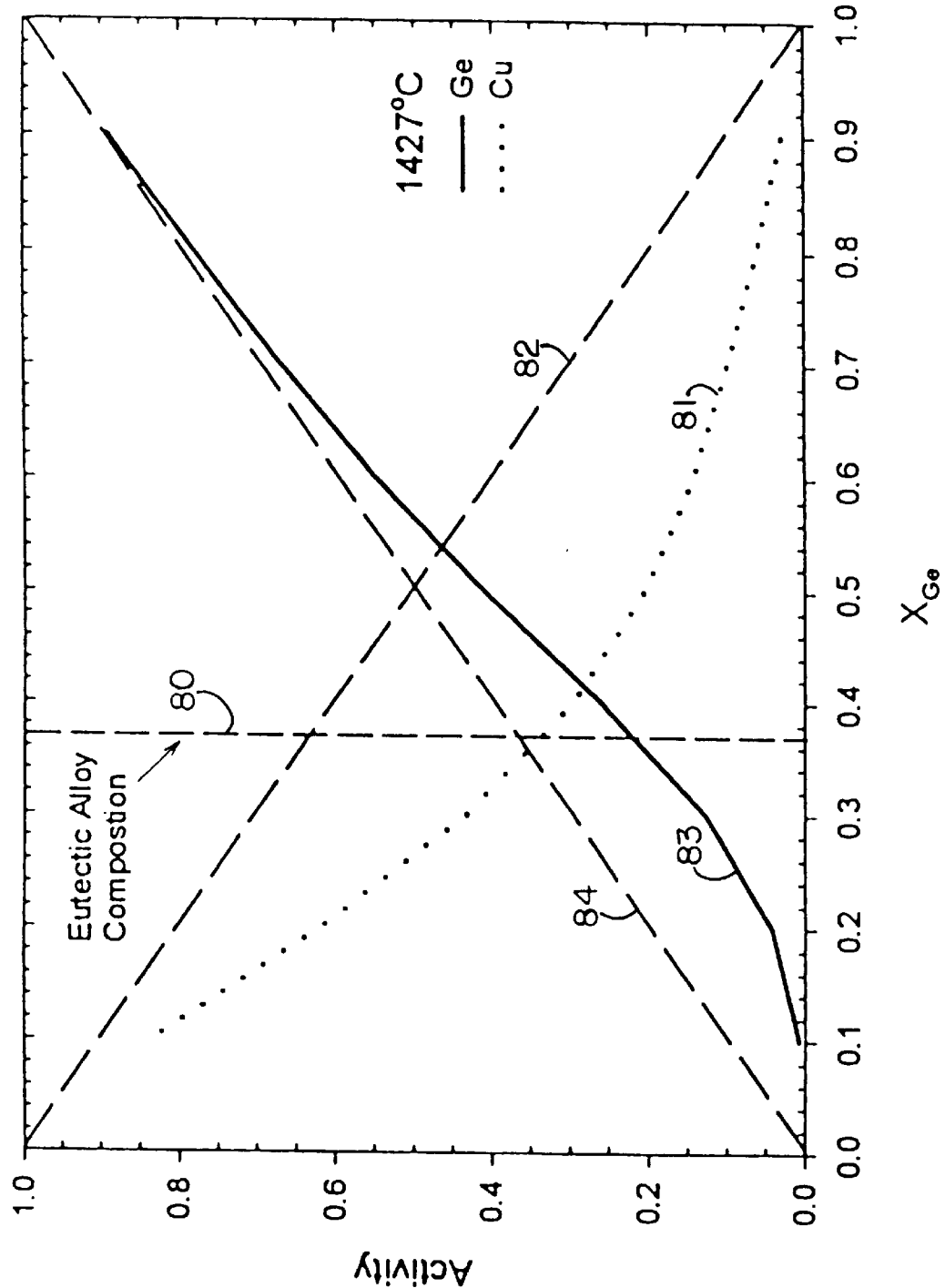
FIG. 18 are diagrams illustrating calculated chemical properties of Cu—Ge liquid alloys showing the activities of Cu and Ge in alloys at 1427° C.
Figure 19:
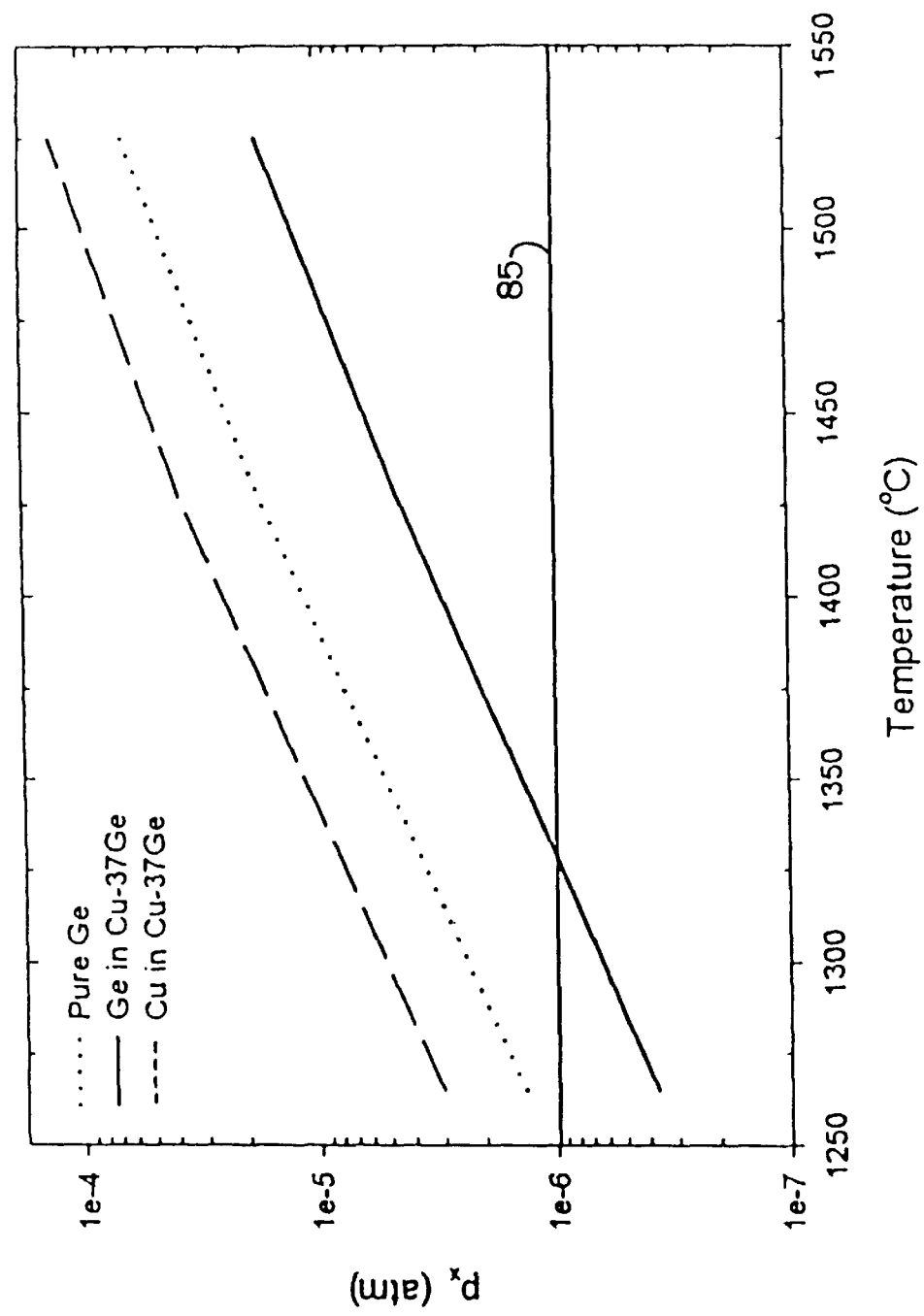
FIG. 19 are diagrams illustrating the partial pressure of Ge over pure molten Ge compared to Ge and Cu over a eutectic Cu—37Ge alloy as a function of temperature.
Figure 20:
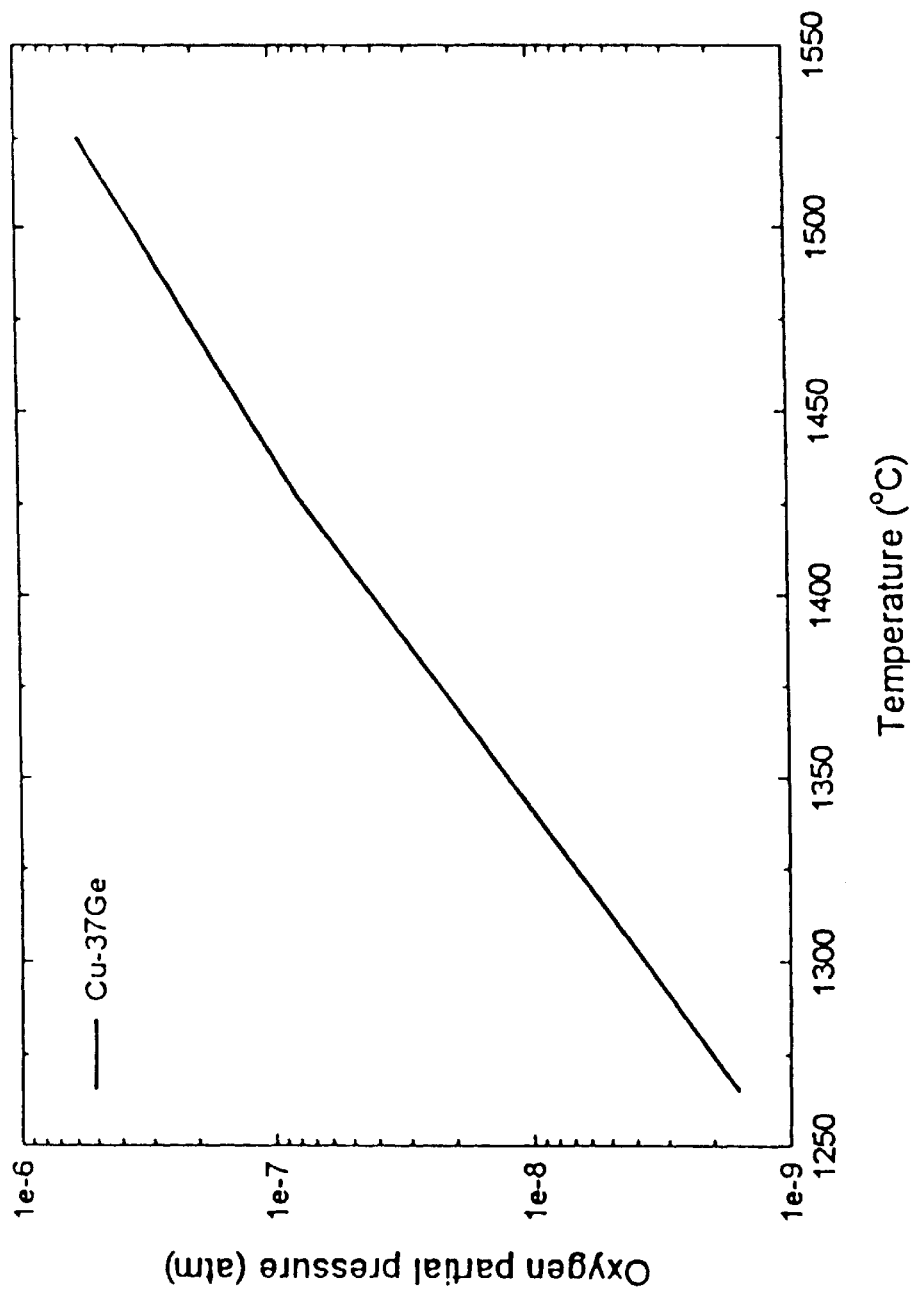
FIG. 20 is a diagram illustrating the equilibrium oxygen partial pressure for the $GeGeO_2$ buffer over a Cu—37Ge alloy as a function of temperature.

While equations exist that predict activities in the region of the liquidus line of the Cu—Ge phase diagram shown in FIG. 17, they are not necessarily of use much beyond liquidus because of difficulties in extrapolations to high temperatures. Experimentally determined values of Ge and Cu activities determined directly in liquid alloys at three temperatures (1265°, 1427° and 1525° C.) were used for the feasibility of float processing on such systems. FIG. 18 shows the calculated chemical properties of the Cu—Ge liquid alloy, specifically the activities of Cu and Ge and alloys at 1427° C., with the line 80 representing the eutectic composition, the line 81 the calculated activities of Cu compared to the ideal line 82, and the line 83 representing the calculated activities for Ge versus the ideal line 84. The depression of the activity of Ge relative to the Raoultian (ideal) values is about 40% for the eutectic composition Cu—37Ge. Such a depression should be sufficient to allow for elevated processing up to about 1400° C. using Cu—37Ge based on the vapor pressure. The vapor pressure of Cu is nearly an order of magnitude higher than the Ge at all temperatures. There is a small decrease in the activity of Cu due to solution formation. FIG. 19 illustrates the partial pressure of Ge over pure molten Ge compared to Ge and Cu over the eutectic Cu—37Ge alloy as a function of temperature. The line 85 at $10^{-6}$ atm. indicates the vapor pressure level postulated to display a maximum acceptable metal vapor pressure of the oxidizable float metal component based on experience from the conventional float metal processes (at 1100° C.). To maintain a Cu—37Ge alloy oxide-free, a reducing atmosphere of CO and $CO_2$ mixed at a ratio of 3:1 may be used. FIG. 20 illustrates the equilibrium oxygen partial pressure for the Ge—$GeO_2$ buffer over a Cu—37Ge alloy as a function of temperature.

Figure 21:
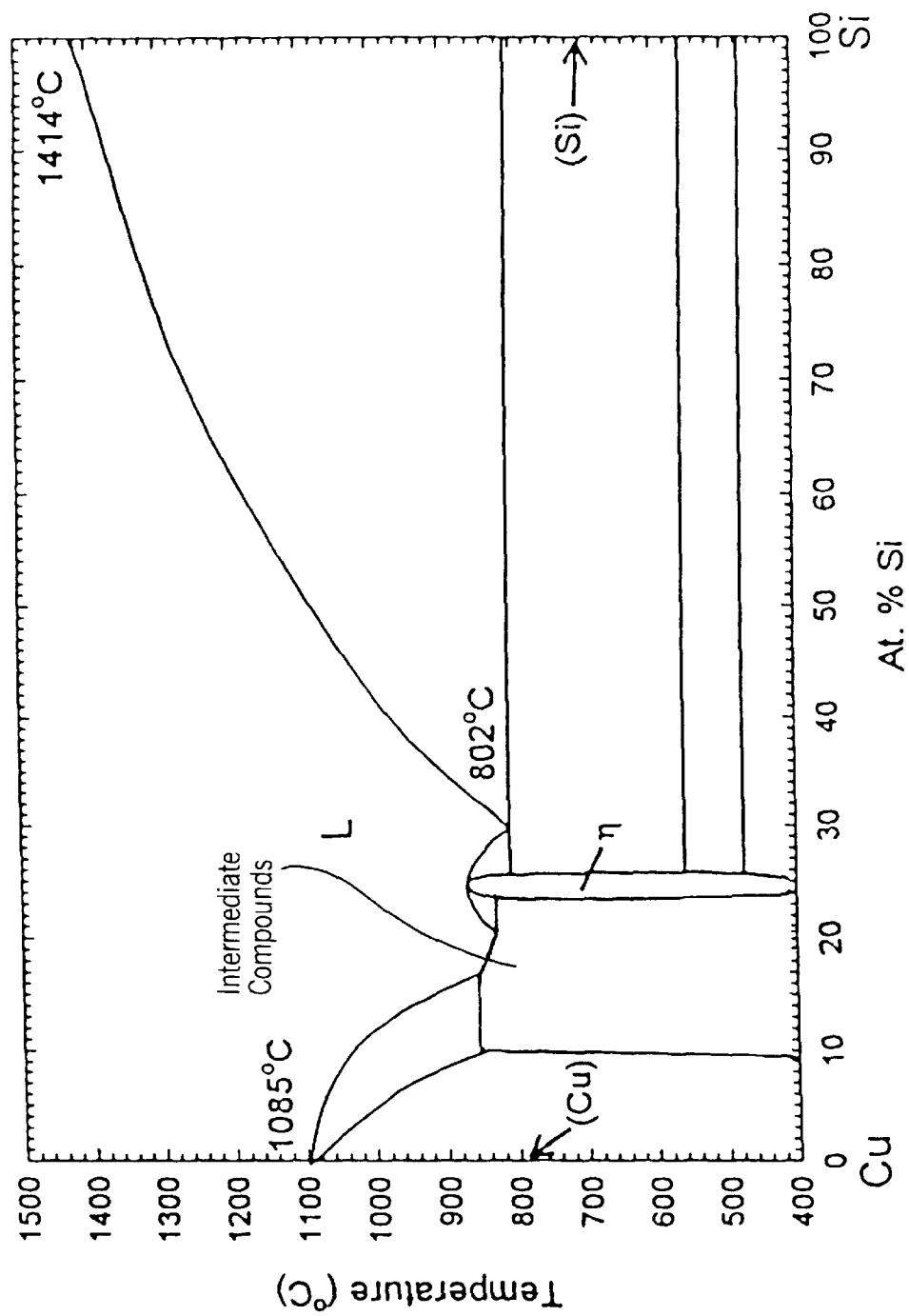
FIG. 21 is a Cu—Si phase diagram.

The phase diagram for the Cu—Si system is shown in FIG. 21 and is seen to be similar to the Cu—Ge system. The tendency for compound formation in Cu-rich alloys translates to complex behavior in the liquid phase, with potential strong associate formation.

Figure 22:
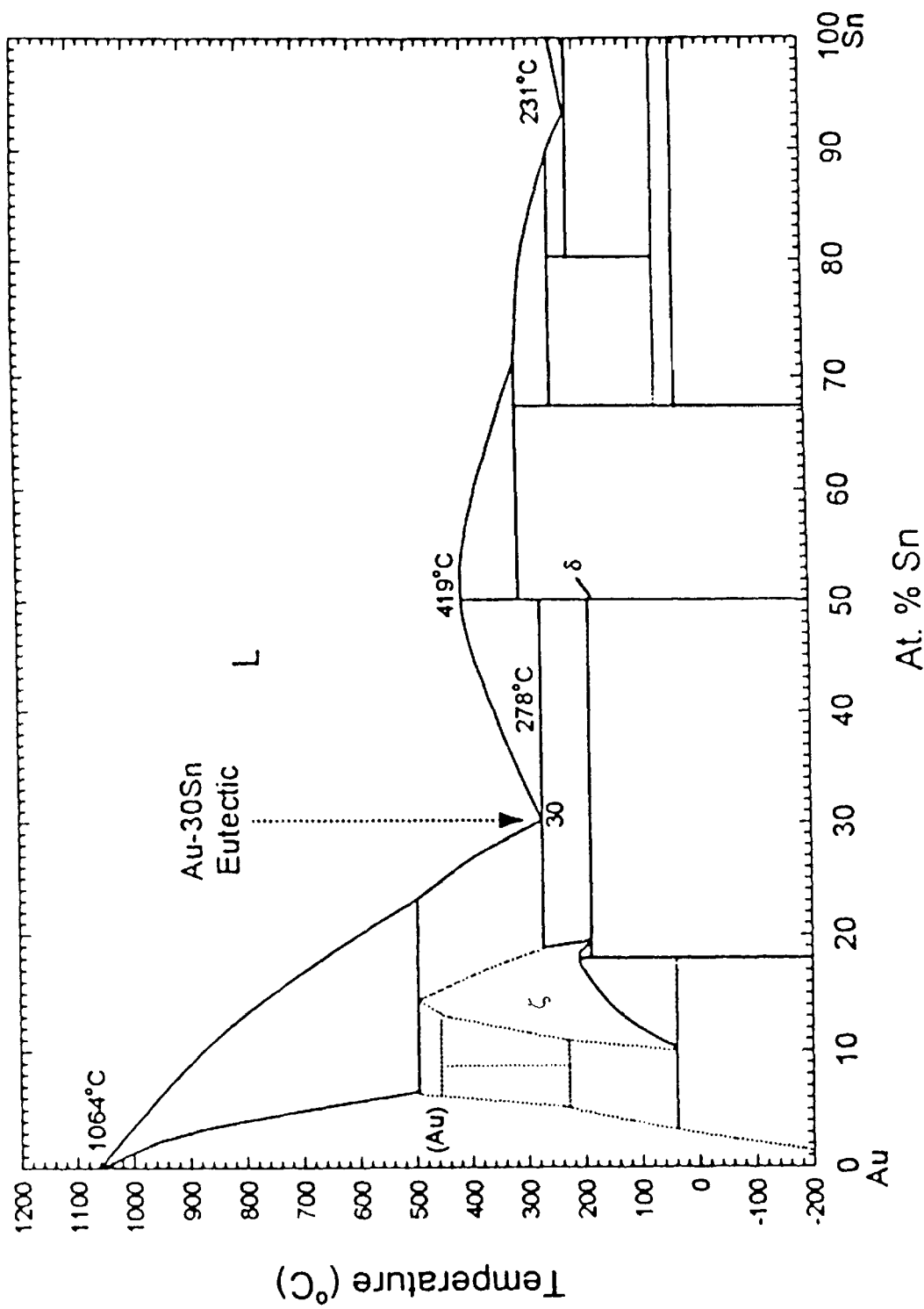
FIG. 22 is an Au—Sn phase diagram.

In general, both the vapor pressure of a liquid metal and (in some cases, depending on the composition) its reactivity with a silicate melt will be lowered through the formation of an alloy. These features can be lowered drastically, compared to the pure metal, if the liquid alloy is strongly exothermic, that is, if the activities of the components in a solution demonstrate a significant negative deviation from ideal (Raoultian) behavior. For binary metallic mixtures, it is possible to identify an exothermic liquid solution from a standard temperature-composition phase diagram by the presence of a eutectic reaction bounded by one or two intermediate phases (compounds); because the formation of intermediate compounds is strongly exothermic, an associated eutectic reaction can only occur for a strongly exothermic liquid solution. The absence of such reactions on the phase diagram, however, does not a priori indicate that the liquid solution is not exothermic. Gibbs energy analysis of many binary alloys of the Group 14 metals and metaloids with the so-called noble metals of Group 11 demonstrate exothermic liquid solutions (e.g., Au—Si, Au—Ge, CuGe, Cu—Si as discussed above). The Au—Sn system, the phase diagram for which is shown in FIG. 22, also fits these criteria.

Figure 23:
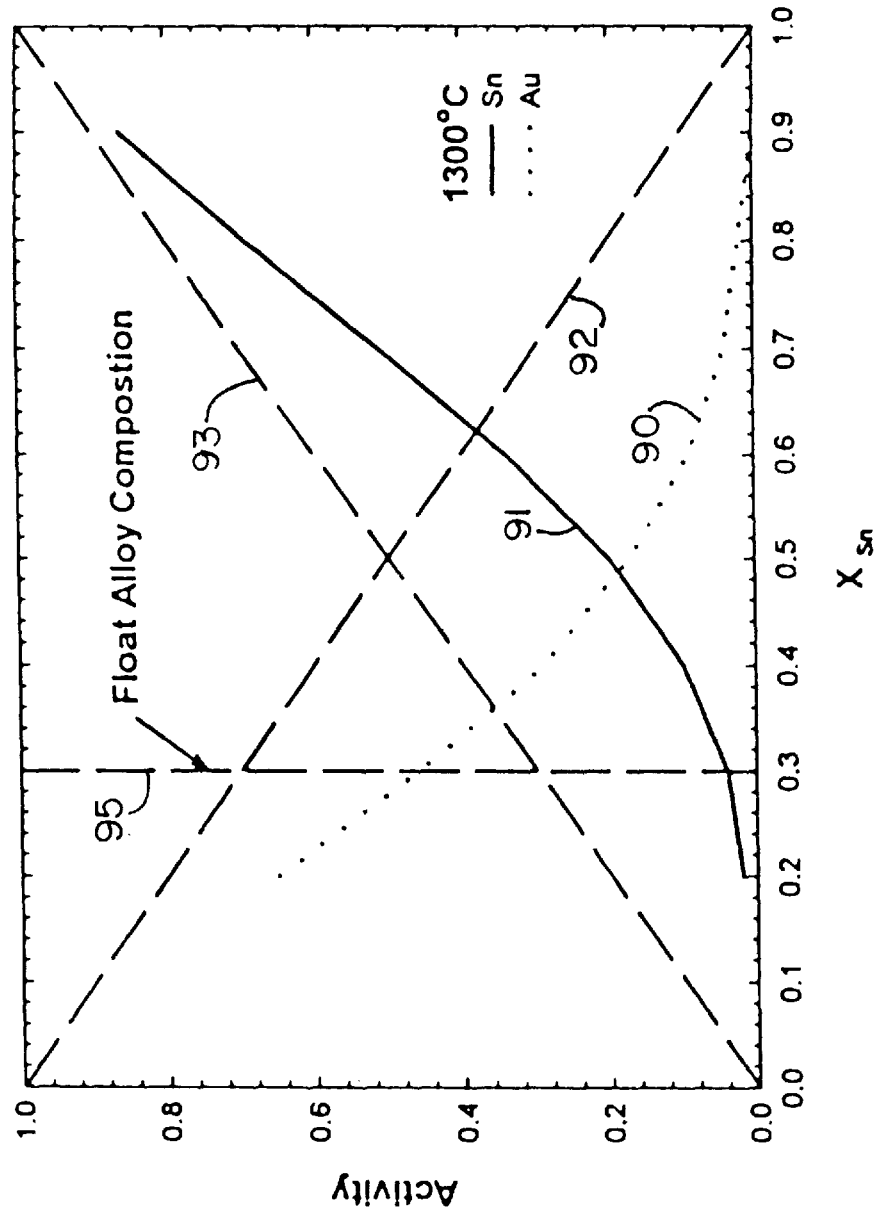
FIG. 23 are diagrams illustrating calculated chemical properties of AuSn liquid alloys indicating the activities of Au and Sn in alloys at 1300° C.
Figure 24:
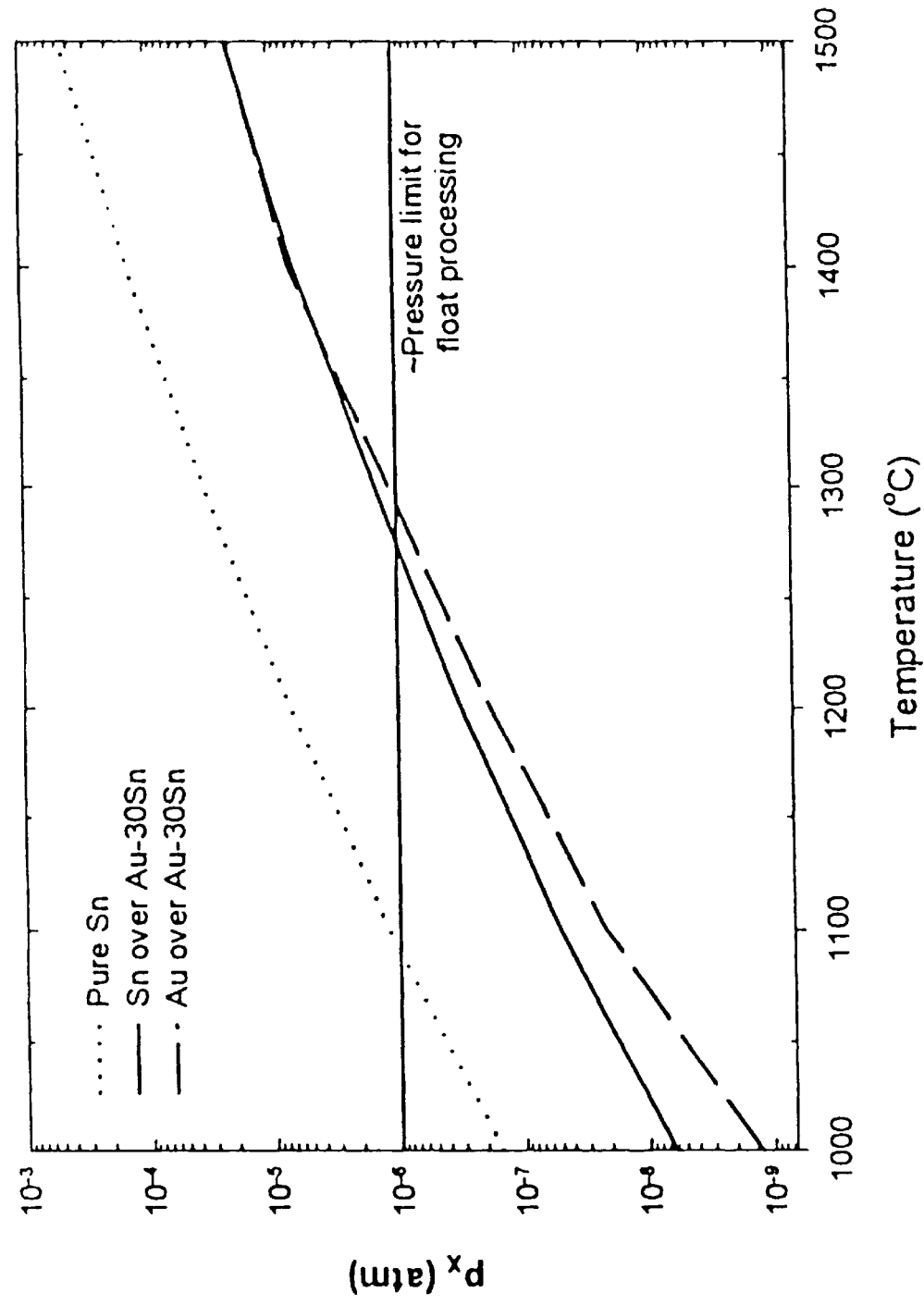
FIG. 24 are diagrams illustrating partial pressure of Sn over pure molten Sn compared to Sn and Au over a eutectic Au—30Sn alloy as a function of temperature.
Figure 25:
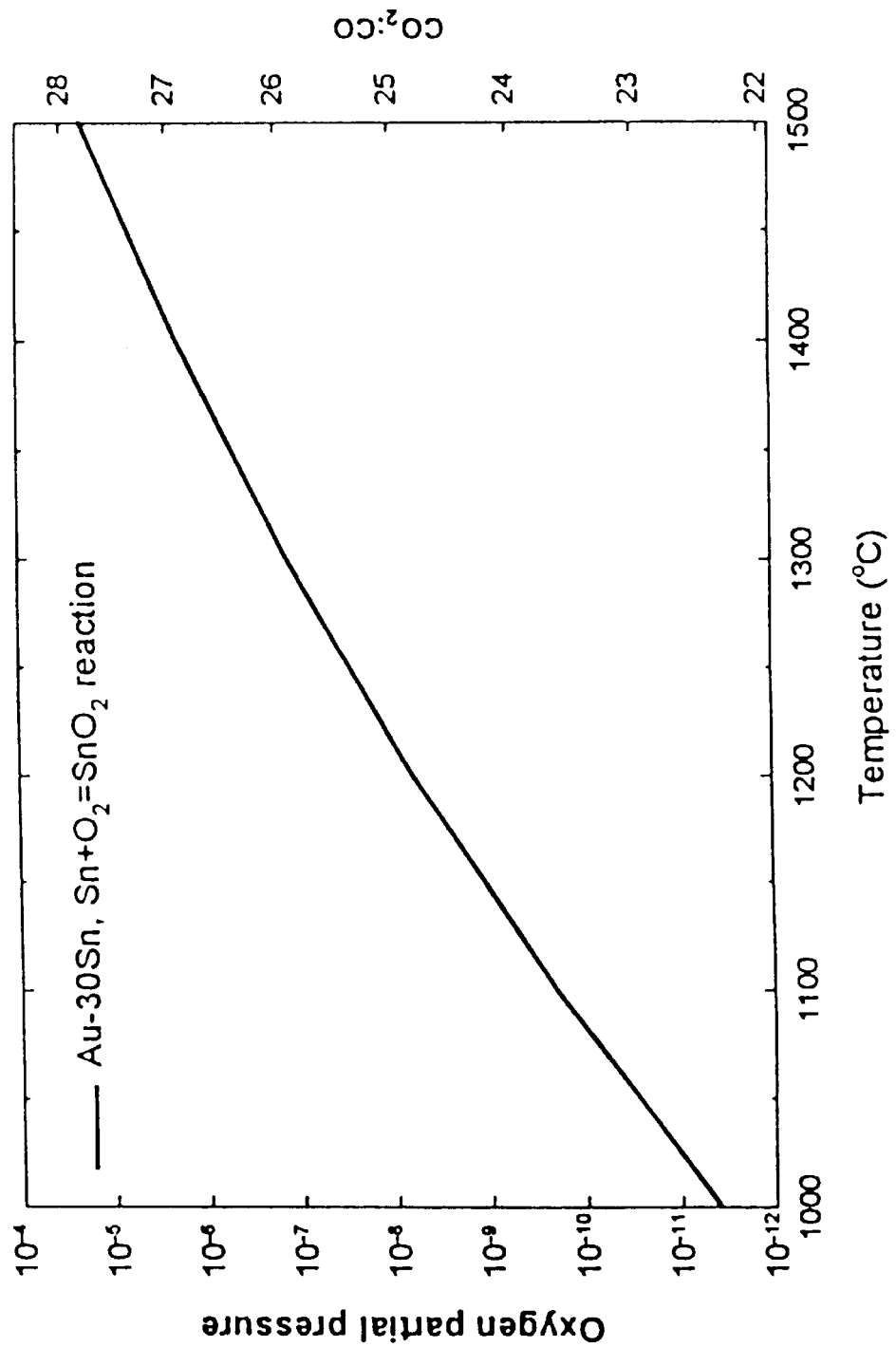
FIG. 25 is a diagram illustrating the equilibrium oxygen partial pressure and the associated equilibrium mixture of CO and $CO_2$ to achieve that partial pressure for the Sn—$SnO_2$ buffer over an Au—30Sn alloy as a function of temperature.

A liquid alloy from the Au—Sn system allows a more direct comparison with results of glass floats on pure liquid Sn. As shown in FIG. 23, the activities of Au and Sn, shown by the lines 90 and 91, respectively, calculated at 1300° C. for binary alloys from 20% to 90% Sn, are compared to the values for ideal solutions indicated by the lines 92 and 93, respectively. As the eutectic composition of Au—30Sn, indicated by the line 95, the activity of Sn is depressed to 0.039 from the ideal solution value of 0.30. The activity of Au is reduced to 0.41 from 0.70. The corresponding values of partial pressures of the components over the Au—30Sn eutectic alloy melt is shown in FIG. 24 and is compared to that for pure Sn. It is seen that the Sn vapor pressure associated with the conventional float process ($p_{Sn} \approx 10^{-6}$ atm at 1100° C.) is not reached by the eutectic Au—30Sn alloy until its temperature reaches about 1350° C. FIG. 25 shows the calculated equilibrium oxygen partial pressure for the Sn—$SnO_2$ reaction for the alloy, and the mixture of CO and $CO_2$ that, at equilibrium, will provide that oxygen activity. The data indicate that the Au—30Sn alloy can be maintained oxide-free with a simple 26:1 mixture of $CO_2$ and CO at about 1300° C.

An exemplary Au—30Sn alloy was prepared from 99.9 wt. % pure Au coinage or splatter shot mixed with 99.99% pure Sn (Alpha Aesar # 36691) which was in the form of about 1 mm granules. The alloy was prepared by melting a mechanical mixture of the Au and Sn in a tube furnace at 1200° C. under a flowing mixture of CO and $CO_2$ at a ratio of 3:1 for one hour; this time was sufficient for the surface of a molten alloy to appear free of all oxides. The alloy was allowed to cool to room temperature under the controlled atmosphere. The process was carried out with the glasses PT and ST as described above using the Au—30Sn alloy bath.

Figure 26:
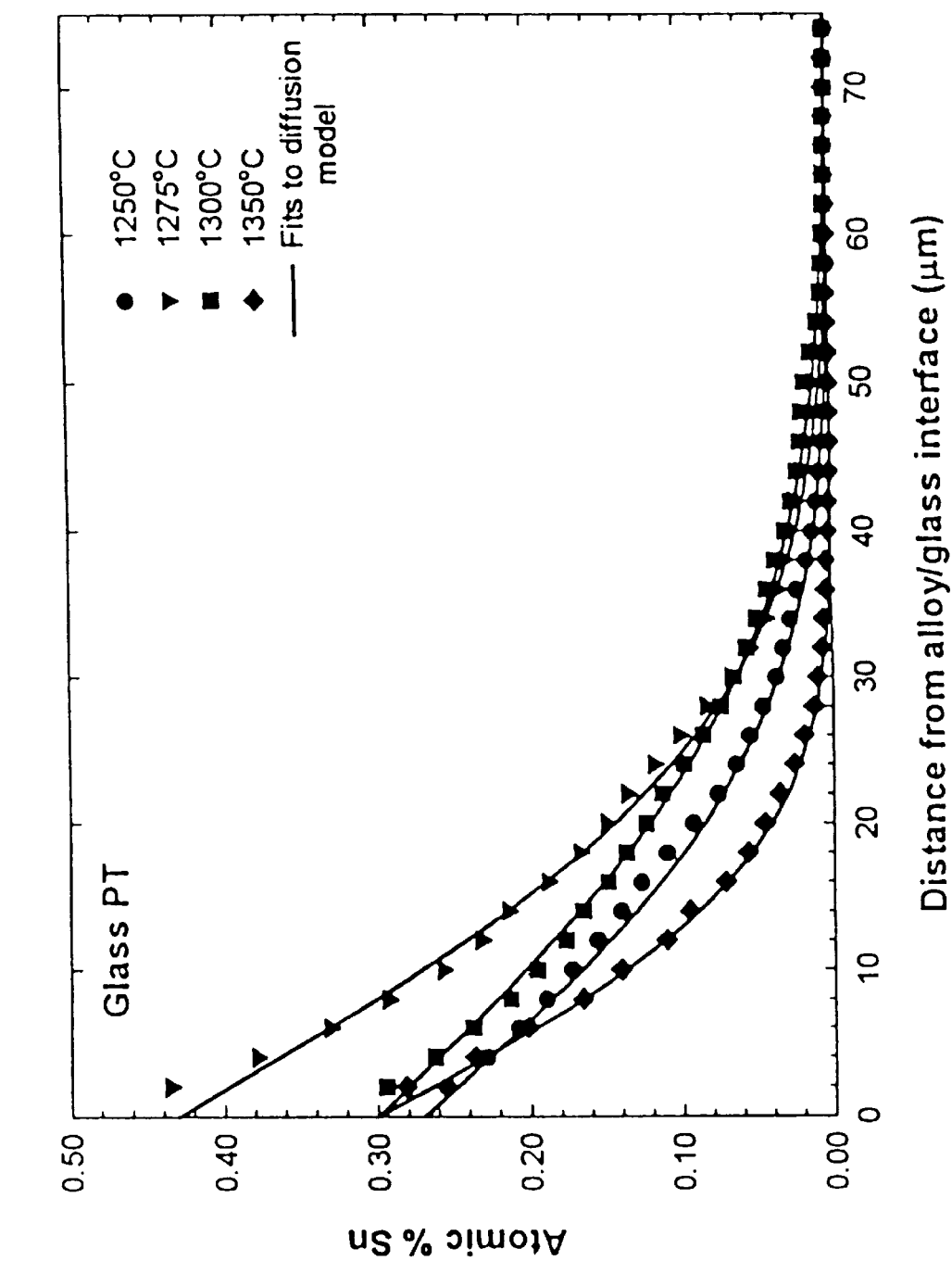
FIG. 26 are diagrams illustrating Sn concentration versus depth profiles from electron microprobe WDS for the exemplary glass PT reacted 30 minutes on Au—30Sn.
Figure 27:
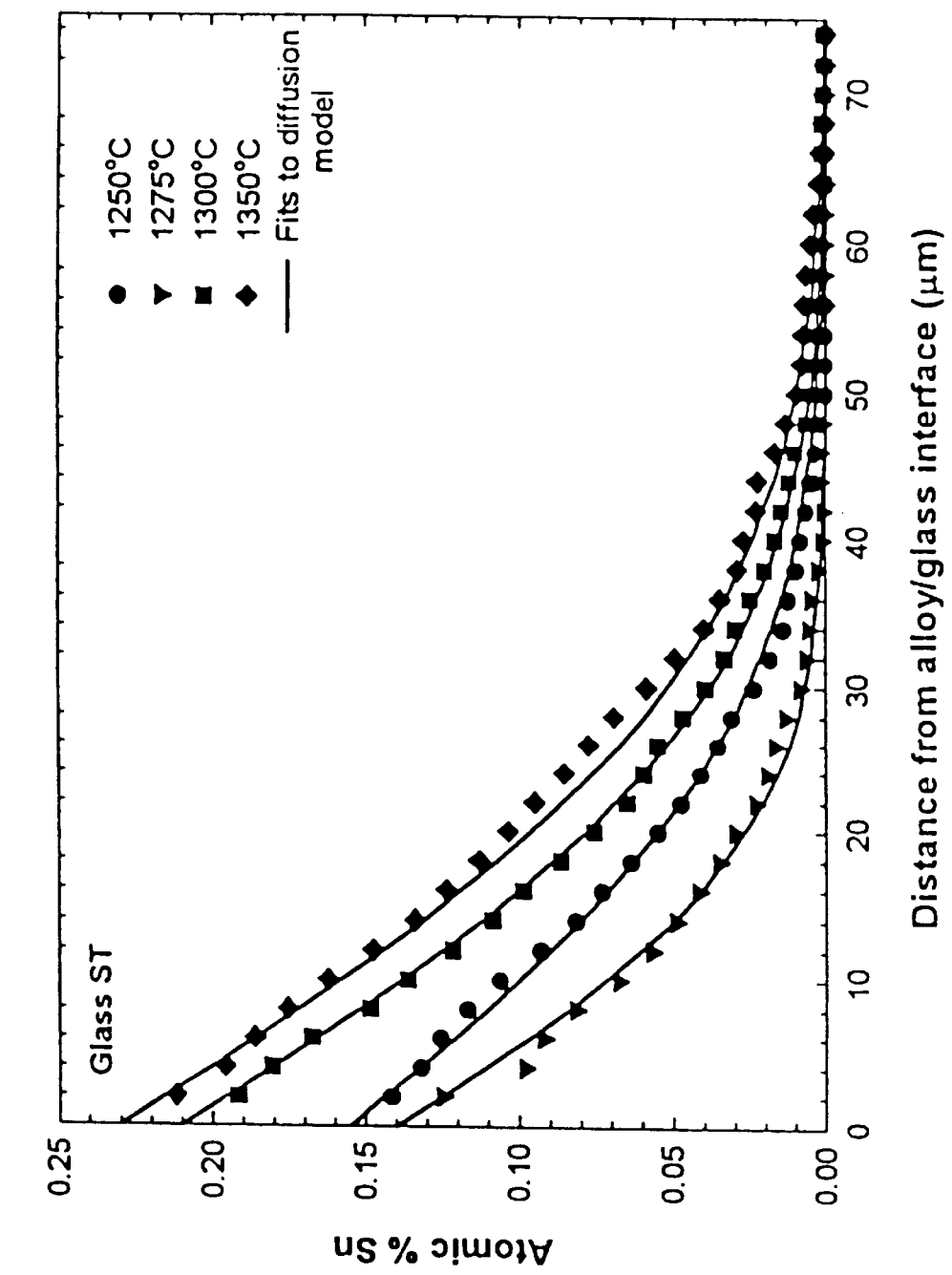
FIG. 27 are diagrams illustrating Sn concentration versus depth profiles from electron microprobe WDS for the exemplary glass ST reacted for 30 minutes on Au—30Sn.

The variations of Sn concentration in the glasses with distance from the float surface, as determined by EMPA/WDS is shown in FIG. 26 for the glass PT and in FIG. 27 for the glass ST. The range of depths of Sn penetration is about 30–60 μm, being nearly the same for both glasses. It is noted, however, that the actual mass flux of Sn in Fe-doped glass ST is less than in PT, as the near-surface concentrations are roughly half those of PT.

Figure 28:
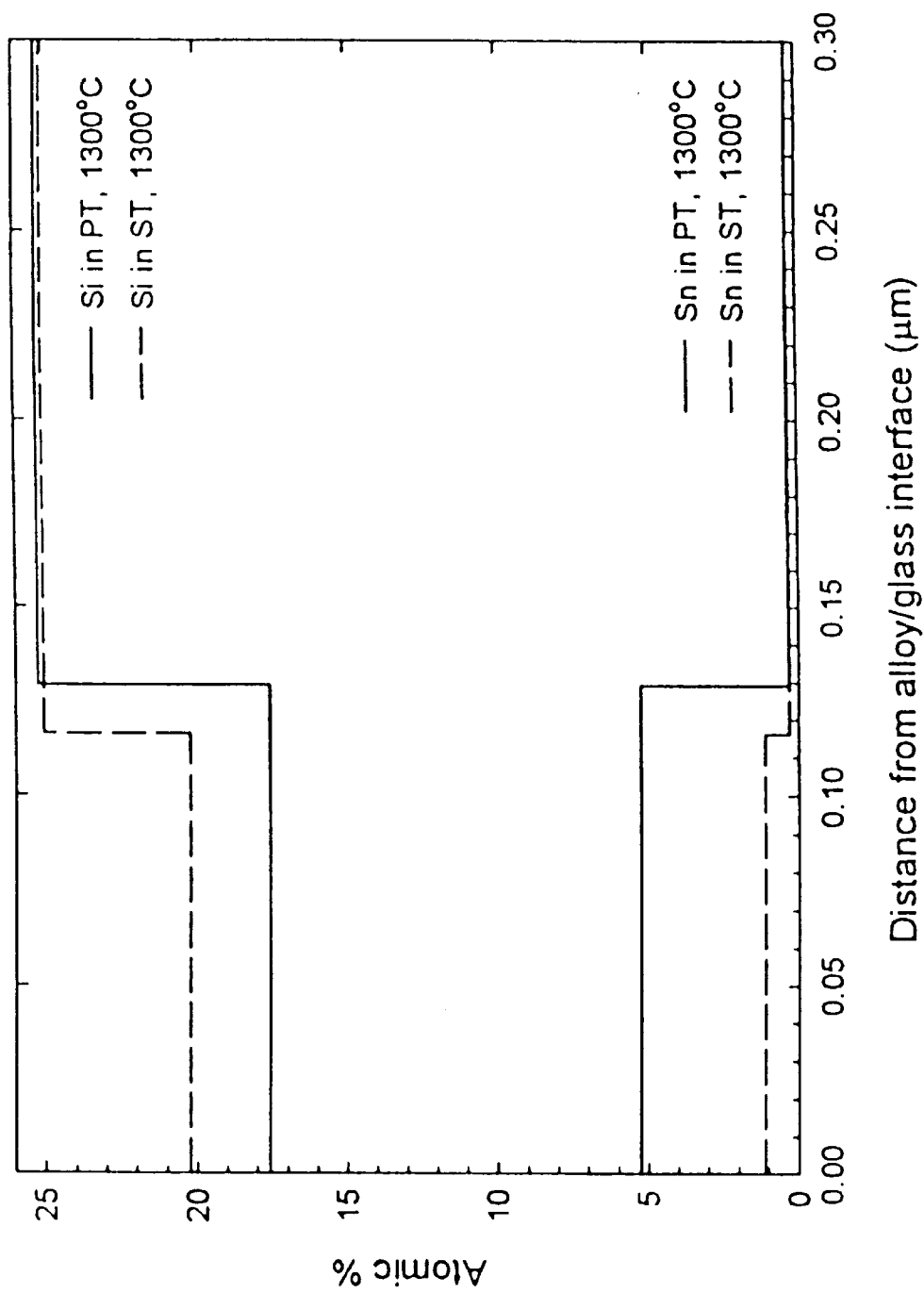
FIG. 28 are diagrams illustrating concentration profiles from RBS data for Si (depleted) and Sn (enriched) for the glasses PT and ST.

While changes in the Sn and Fe concentrations at the surface are easily discerned, changes in the edges for other elements in the spectra are less obvious. While appearing visually to have been unaffected by the reaction, careful modeling of the Si edge reveals that there has been a decrease of several atomic percent in Si at the surface layer. The magnitude of the Si depletion from the surface corresponds roughly to the uptake of Sn into the glass at the surface, as illustrated in FIG. 28. This figure also shows the decrease in Sn uptake from float bath for the Fe bearing glass ST relative to PT. In all of the foregoing processes, the glass melt was maintained on the liquid metal bath surface for 30 minutes.

The present invention may be used with glasses in addition to the borosilicate glasses which were described above for purposes of exemplifying the invention.

It is understood that the invention is not limited to the particular embodiments set forth herein as illustrative, but embraces all such modified forms thereof as come within the scope of the following claims.

What is claimed is:

1. A method of making float glass from glass materials requiring a forming temperature substantially above 1100° C., comprising the steps of:

(a) melting glass forming materials in a melting furnace to provide a liquid glass melt at a temperature above 1100° C.;

(b) providing a float bath enclosure having a float bath tank containing a liquid metal alloy, the liquid metal alloy comprising an exothermic alloy formed of a solvent metal selected from the group consisting of gold, silver and copper and a solute selected from the group consisting of germanium, silicon and tin; and (c) feeding the glass melt into the float bath enclosure at an entrance end of the float bath and forming a sheet of glass on the liquid metal alloy and drawing the formed sheet from an exit end of the float glass enclosure, while maintaining the liquid metal bath at a temperature greater than 1100° C. adjacent to the entrance end and at a lower temperature adjacent to the exit end which is cool enough to allow hardening of the glass melt sheet and which is above the melting temperature of the metal bath.

2. A method of making float glass from glass materials requiring a forming temperature substantially above 1100° C., comprising the steps of:
(a) melting glass forming materials in a melting furnace to provide a liquid glass melt at a temperature above 1100° C.;
(b) providing a float bath enclosure having a float bath tank containing a liquid metal alloy, the liquid metal alloy comprising an exothermic alloy formed of a solvent metal selected from the group consisting of gold, silver and copper and a solute selected from the group consisting of germanium, silicon and tin wherein the solvent and solute in the liquid metal alloy are substantially a eutectic composition; and
(c) feeding the glass melt into the float bath enclosure at an entrance end of the float bath and forming a sheet of glass on the liquid metal alloy and drawing the formed sheet from an exit end of the float glass enclosure, while maintaining the liquid metal bath at a temperature greater than 1100° C. adjacent to the entrance end and at a lower temperature adjacent to the exit end which is cool enough to allow hardening of the glass melt sheet and which is above the melting temperature of the metal bath.

3. The method of claim 2 wherein the liquid metal alloy is formed of Au—28Ge.

4. The method of claim 2 wherein the liquid metal alloy is formed of Au—18Si.

5. The method of claim 2 wherein the liquid metal alloy is formed of Cu—37Ge.

6. The method of claim 2 wherein the liquid metal alloy is formed of Cu—30Si.

7. The method of claim 2 wherein the liquid metal bath is formed of Au—30Sn.

8. The method of claim 2 wherein the glass forming materials are selected to form a borosilicate glass.

9. A method of making float glass from glass materials requiring a forming temperature substantially above 1100° C., comprising the steps of:
(a) melting glass forming materials in a melting furnace to provide a liquid glass melt at a temperature above 1100° C.;
(b) providing a float bath enclosure having a float bath tank containing a liquid metal alloy, the liquid metal alloy comprising an exothermic alloy selected from the group consisting of gold-germanium, gold-silicon, copper-germanium, and copper-silicon; and
(c) feeding the glass melt into the float bath enclosure at an entrance end of the float bath and forming a sheet of glass on the liquid metal alloy and drawing the formed sheet from an exit end of the float glass enclosure, while maintaining the liquid metal bath at a temperature greater than 1100° C. adjacent to the entrance end and at a lower temperature adjacent to the exit end which is cool enough to allow hardening of the glass melt sheet and which is above the melting temperature of the metal bath.

10. The method of claim 9 wherein the liquid metal bath is maintained at a temperature in the range of 1200° C. to 1500° C. adjacent to the entrance end.

11. A method of making float glass from glass materials requiring a forming temperature substantially above 1100° C., comprising the steps of:
(a) melting glass forming materials in a melting furnace to provide a liquid glass melt at a temperature above 1100° C.;
(b) providing a float bath enclosure having a float bath tank containing a liquid metal alloy, the liquid metal alloy comprising an exothermic alloy selected from the group consisting of gold-germanium, gold-silicon, copper-germanium, and copper-silicon wherein the solvent and solute in the liquid metal alloy are substantially a eutectic composition; and
(c) feeding the glass melt into the float bath enclosure at an entrance end of the float bath and forming a sheet of glass on the liquid metal alloy and drawing the formed sheet from an exit end of the float glass enclosure, while maintaining the liquid metal bath at a temperature greater than 1100° C. adjacent to the entrance end and at a lower temperature adjacent to the exit end which is cool enough to allow hardening of the glass melt sheet and which is above the melting temperature of the metal bath.

12. The method of claim 11 wherein the liquid metal alloy is selected from the group consisting of Au—28Ge, Au—18Si, Cu—37Ge, and Cu—30Si.

13. The method of claim 11 wherein the glass forming materials are selected to form a borosilicate glass.

14. Apparatus for float glass processing comprising:
(a) a melting furnace in which a liquid glass melt may be formed of glass forming materials at a temperature above 1100° C.;
(b) a float bath enclosure adjacent to the melting furnace having a float bath tank containing a liquid metal alloy bath and receiving liquid glass melt from the melting furnace at an entrance end and discharging a sheet of formed glass at an exit end, the metal bath comprising an exothermic alloy of a solvent metal selected from the group consisting of gold, silver and copper and a solute selected from the group consisting of germanium, silicon and tin, and including means for maintaining the temperature of the bath above 1100° C. adjacent to the entrance end and at a lower temperature adjacent to the exit end which is cool enough to allow hardening of the glass melt and which is above the melting point of the metal bath.

15. Apparatus for float glass processing comprising:
(a) a melting furnace in which a liquid glass melt may be formed of glass forming materials at a temperature above 1100° C.;
(b) a float bath enclosure adjacent to the melting furnace having a float bath tank containing a liquid metal alloy bath and receiving liquid glass melt from the melting furnace at an entrance end and discharging a sheet of formed glass at an exit end, the metal bath comprising an exothermic alloy of a solvent metal selected from the group consisting of gold, silver and copper and a solute selected from the group consisting of germanium, silicon and tin, wherein the solvent and solute in the liquid metal alloy are substantially a eutectic composition; and including means for maintaining the temperature of the bath above 1100° C. adjacent to the entrance end and at a lower temperature adjacent to the exit end which is cool enough to allow hardening of the glass melt and which is above the melting point of the metal bath.

16. The apparatus of claim 15 wherein the liquid metal alloy is formed of Au—28Ge.

17. The apparatus of claim 15 wherein the liquid metal alloy is formed of Au—18Si.

18. The apparatus of claim 15 wherein the liquid metal alloy is formed of Cu—37Ge.

19. The apparatus of claim 15 wherein the liquid metal alloy is formed of Cu—30Si.

20. The apparatus of claim 15 wherein the liquid metal alloy is formed of Au—30Sn.

21. A method of making float glass from glass materials requiring a forming temperature substantially above 1100° C., comprising the steps of:
   (a) melting glass forming materials in a melting furnace to provide a liquid glass melt at a temperature above 1100° C.;
   (b) providing a float bath enclosure having a float bath tank containing a liquid metal alloy, the liquid metal alloy comprising an exothermic alloy formed of gold as a solvent metal and tin as a solute; and
   (c) feeding the glass melt into the float bath enclosure at an entrance end of the float bath and forming a sheet of glass on the liquid metal alloy and drawing the formed sheet from an exit end of the float glass enclosure, while maintaining the liquid metal bath at a temperature greater than 1100° C. adjacent to the entrance end and at a lower temperature adjacent to the exit end which is cool enough to allow hardening of the glass melt sheet and which is above the melting temperature of the metal bath.

22. The method of claim 21 wherein the gold solvent and tin solute in the liquid metal alloy are substantially a eutectic composition.

23. The method of claim 21 wherein the liquid metal bath is formed of Au—30Sn.

24. A liquid metal float bath used in float glass processing comprising a float bath tank and a liquid metal alloy contained in the float bath tank comprising an exothermic and substantially eutectic composition of a solute metal selected from the group consisting of gold, silver and copper and a solute selected from the group consisting of germanium and silicon.

25. The float bath alloy of claim 24 wherein the liquid metal alloy is formed of Au—28Ge.

26. The float bath alloy of claim 24 wherein the liquid metal alloy is formed of Au—18Si.

27. The float bath alloy of claim 24 wherein the liquid metal alloy is formed of Cu—37Ge.

28. The float bath alloy of claim 24 wherein the liquid metal alloy is formed of Cu—30Si.

29. A liquid metal float bath used in float glass processing comprising a float bath tank and a liquid metal alloy contained in the float bath tank comprising an exothermic and substantially eutectic composition selected from the group consisting of gold-germanium, gold-silicon, copper-germanium and copper-silicon.

30. The liquid metal float bath alloy of claim 29 wherein the alloy is selected from the group consisting of Au—28Ge, Au—18Si, Cu—37Ge and Cu—30Si.

31. A liquid metal float bath used in float glass processing comprising a float bath tank and a liquid metal alloy contained in the float bath tank comprising an exothermic and substantially eutectic composition of gold and tin.

32. The liquid metal float bath alloy of claim 31 which is formed of Au—30Sn.

33. A method of making float glass from glass materials requiring a forming temperature substantially above 1100° C., comprising the steps of:
   (a) melting glass forming materials in a melting furnace to provide a liquid glass melt at a temperature above 1100° C.;
   (b) providing a float bath enclosure having a float bath tank containing a liquid metal alloy, the liquid metal alloy comprising an exothermic alloy formed of a solvent metal selected from the group consisting of gold and silver, and a solute selected from the group consisting of germanium, silicon and tin; and
   (c) feeding the glass melt into the float bath enclosure at an entrance end of the float bath and forming a sheet of glass on the liquid metal alloy and drawing the formed sheet from an exit end of the float glass on the liquid metal alloy and drawing the formed sheet from an exit end of the float glass enclosure, while maintaining the liquid metal bath at a temperature greater than 1100° C. adjacent to the entrance end and at a lower temperature adjacent to the exit end which is cool enough to allow hardening of the glass melt sheet and which is above the melting temperature of the metal bath.

34. The method of claim 33 wherein the solvent and solute in the liquid metal alloy are substantially a eutectic composition.

35. The method of claim 33 wherein the glass forming materials are selected to form a borosilicate glass.

36. A method of making float glass from glass materials requiring a forming temperature substantially above 1100° C., comprising the steps of:
   (a) melting glass forming materials in a melting furnace to provide a liquid glass melt at a temperature above 1100° C.;
   (b) providing a float bath enclosure having a float bath tank containing a liquid metal alloy, the liquid metal alloy comprising an exothermic alloy selected from the group consisting of gold-germanium and gold-silicon; and
   (c) feeding the glass melt into the float bath enclosure at an entrance end of the float bath and forming a sheet of glass on the liquid metal alloy and drawing the formed sheet from an exit end of the float glass enclosure, while maintaining the liquid metal bath at a temperature greater than 1100° C. adjacent to the adjacent to the entrance end and at a lower temperature adjacent to the exit end which is cool enough to allow hardening of the glass melt sheet and which is above the melting temperature of the metal bath.

37. The method of claim 36 wherein the liquid metal bath is maintained at a temperature in the range of 1200° C. to 1500° C. adjacent to the entrance end.

38. The method of claim 36 wherein the solvent and solute in the liquid metal alloy are substantially a eutectic composition.

39. The method of claim 38 wherein the liquid metal alloy is selected from the group consisting of Au—28Ge and Au—18Si.

40. The method of claim 36 wherein the glass forming materials are selected to form a borosilicate glass.

41. Apparatus for float glass processing comprising:
   (a) a melting furnace in which a liquid glass melt may be formed of glass forming materials at a temperature above 1100° C.;
   (b) a float bath enclosure adjacent to the melting furnace having a float bath tank containing a liquid metal alloy bath and receiving liquid glass melt from the melting furnace at an entrance end and discharging a sheet of formed glass at an exit end, the metal bath comprising an exothermic alloy of a solvent metal selected from the group consisting of gold and silver, and a solute selected from the group consisting of germanium, silicon and tin, and including means for maintaining the temperature of the bath above 1100° C. adjacent to the entrance end and at a lower temperature adjacent to the exit end which is cool enough to allow hardening of the glass melt and which is above the melting point of the metal bath.

42. The apparatus of claim 41 wherein the solvent and solute in the liquid metal alloy are substantially a eutectic composition.

* * * * *

UNITED STATES PATENT AND TRADEMARK OFFICE
CERTIFICATE OF CORRECTION

PATENT NO. : 6,065,309
DATED : May 23, 2000
INVENTOR(S) : Reid Franklin Cooper, Glen Bennett Cook It is certified that error appears in the above-identified patent and that said Letters Patent is hereby corrected as shown below:

Column 5,
Line 10, delete the word "a" between the words "for" and "another".

Column 16,
Line 43, after "1100°C. adjacent to the", delete the duplicate occurrence of "adjacent to the".

Signed and Sealed this

Fourteenth Day of August, 2001

*Attest:*

NICHOLAS P. GODICI
*Attesting Officer*     *Acting Director of the United States Patent and Trademark Office*